(12) United States Patent
Dong et al.

(10) Patent No.: US 9,047,352 B1
(45) Date of Patent: Jun. 2, 2015

(54) CENTRALIZED SEARCHING IN A DATA STORAGE ENVIRONMENT

(71) Applicants: Dazhi Dong, Shanghai (CN); Scott E. Joyce, Foxboro, MA (US); Bruce R. Rabe, Dedham, MA (US); Xiaogang Wang, Shanghai (CN); Qi Qu, Shangai (CN); Vincent Ma, Shanghai (CN)

(72) Inventors: Dazhi Dong, Shanghai (CN); Scott E. Joyce, Foxboro, MA (US); Bruce R. Rabe, Dedham, MA (US); Xiaogang Wang, Shanghai (CN); Qi Qu, Shangai (CN); Vincent Ma, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 257 days.

(21) Appl. No.: 13/630,079

(22) Filed: Sep. 28, 2012

(51) Int. Cl.
*G06F 17/30* (2006.01)
(52) U.S. Cl.
CPC ................... *G06F 17/30557* (2013.01)

(58) Field of Classification Search
USPC ............................................. 707/769
See application file for complete search history.

(56) References Cited

U.S. PATENT DOCUMENTS

| 8,131,743 | B1 | 3/2012 | Joyce et al. |
| 8,171,046 | B1 | 5/2012 | Joyce et al. |
| 2008/0222122 | A1* | 9/2008 | Morita ............................. 707/4 |

* cited by examiner

*Primary Examiner* — Belix M Ortiz Ditren
(74) *Attorney, Agent, or Firm* — Muirhead and Saturnelli, LLC

(57) ABSTRACT

Described are techniques for searching. Search criteria including parameters is received. It is determined whether to perform searching based on storage provisioned for one or more selected applications identified in the search criteria. If it is determined to perform searching based on storage provisioned for one or more selected applications, first processing is performed in accordance with the search criteria, and otherwise second processing is performed in accordance with the search criteria. Search results produced as a result of one of the first processing and the second processing are received.

20 Claims, 26 Drawing Sheets

SEARCH RESULTS:

Search criteria: SEAGATE

| Object type 395b | Data storage system 395c | Matching Property 395d | Other properties |
|---|---|---|---|
| Share | DS1 | NAME | Model=XYZ, Vendor=EMC |
| Disk | DS2 | VENDOR NAME | Drive type: SAS |
| Pool | DS1 | NAME | Type=RAID5 |
| File System | DS2 | NAME | SEAGATE |

395a → Disk

CENTRALIZED SEARCHING IN A DATA STORAGE ENVIRONMENT

BACKGROUND

1. Technical Field

This application relates to techniques used in connection with computer-based searching techniques.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software may be used in connection with management of data storage systems. The management software, as well as more generally any software, may obtain inputs used in connection with performing an operation or task. For example, user inputs may be obtained using a user interface. The management software may be characterized as a client which issues requests to a server, such as a data storage system, in connection with performing requested operations. The requests may be issued using different protocols and associated interfaces depending on what one or more protocols are supported for use with the particular client.

SUMMARY OF THE INVENTION

In accordance with one aspect of the invention is a method of searching comprising: receiving search criteria including one or more parameters; determining whether to perform searching based on storage provisioned for one or more selected applications identified in said search criteria; if said determining determines to perform searching based on storage provisioned for one or more selected applications, performing first processing in accordance with said search criteria, and otherwise performing second processing in accordance with said search criteria; and receiving search results produced as a result of one of said first processing and said second processing. The first processing and the second processing may include searching, in accordance with said search criteria, data storage configuration data for one or more data storage systems. The search criteria may identify a first application having storage provisioned on at least one of the data storage systems and said determining may determine that searching is performed based on storage provisioned for the first application. The first processing may include determining a set of one or more objects in the data storage configuration data associated with storage provisioned for said first application. The first processing may include searching the set of one or more objects in accordance with said search criteria. The search criteria may identify any of a physical entity in a first of the one or more data storage systems and a logical entity in any of the one or more data storage systems. The search criteria may identify a physical entity that is any of a disk, a physical storage device, a hardware module, a power supply, a link control card, a standby or secondary power supply, a storage processor. The search criteria may identify a logical entity that is any of a host, a pool, a logical storage device, a file system, a shared folder, a share, file, an application, a mailbox, an email, a mail folder, a clone, a mirror, a pool, a named RAID group, a storage group, a virtually provisioned device, an email application, a medical application, a database application, and a data store associated with storage used by applications executing in a virtualized environment on a host. The search criteria may indicate to perform a search with respect to one or more properties of multiple types of objects. The search criteria may indicate to search one or more properties of multiple types of objects to determine if any of said one or more properties of any of said multiple types of objects include a specified value. The data storage configuration data may include objects of a first category and a second category. The first category may include multiple types of objects associated with physical entities on the one or more data storage systems and the second category may include multiple types of objects associated with logical entities of the one or more data storage systems. Search criteria may identify to search all object types included in one of said first category and said second category. The data storage configuration data may include objects representing physical and logical entities in the one or more data storage systems and the second processing may include determining whether values for one or more properties of at least some of the objects match said search criteria. The search criteria may identify a category of object types denoting multiple types of objects and said second processing includes searching said multiple types of objects. The data storage configuration information may represent a data storage configuration for a federation including a plurality of data storage systems.

In accordance with another aspect of the invention is an apparatus comprising: a plurality of data storage systems configured as a data storage federation; data storage configuration data stored in a memory; a management system comprising a computer readable medium with code stored thereon for performing processing including: receiving search criteria including one or more parameters; determining whether to perform searching based on storage provisioned for one or more selected applications identified in said search criteria; if said determining determines to perform searching based on storage provisioned for one or more selected applications, performing first processing in accordance with said search criteria, and otherwise performing second processing in accordance with said search criteria; and receiving search results produced as a result of one of said first processing and said second processing.

In accordance with another aspect of the invention is a computer readable medium comprising code stored thereon for searching, the computer readable medium comprising code for: receiving search criteria including one or more parameters; determining whether to perform searching based on storage provisioned for one or more selected applications identified in said search criteria; if said determining determines to perform searching based on storage provisioned for one or more selected applications, performing first processing in accordance with said search criteria, and otherwise performing second processing in accordance with said search criteria; and receiving search results produced as a result of one of said first processing and said second processing. The first processing and the second processing include searching, in accordance with said search criteria, data storage configuration data for one or more data storage systems. The search criteria may identify a first application having storage provisioned on at least one of the data storage systems and said determining may determine that searching is performed based on storage provisioned for the first application. The first processing may include determining a set of one or more objects in the data storage configuration data associated with storage provisioned for said first application. The first processing may include searching the set of one or more objects in accordance with said search criteria. The search criteria may identify any of a physical entity in a first of the one or more data storage systems and a logical entity in any of the one or more data storage systems. The search criteria may identify a physical entity that is any of a disk, a physical storage device, a hardware module, a power supply, a link control card, a standby or secondary power supply, a storage processor. The search criteria may identify a logical entity that is any of a host, a pool, a logical storage device, a file system, a shared folder, a share, file, an application, a mailbox, an email, a mail folder, a clone, a mirror, a pool, a named RAID group, a storage group, a virtually provisioned device, an email application, a medical application, a database application, and a data store associated with storage used by applications executing in a virtualized environment on a host.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5B, 5C, 8B and 11 are examples of search results that may be displayed in an embodiment in accordance with techniques herein;

DETAILED DESCRIPTION OF EMBODIMENT(S)

Figure 1:
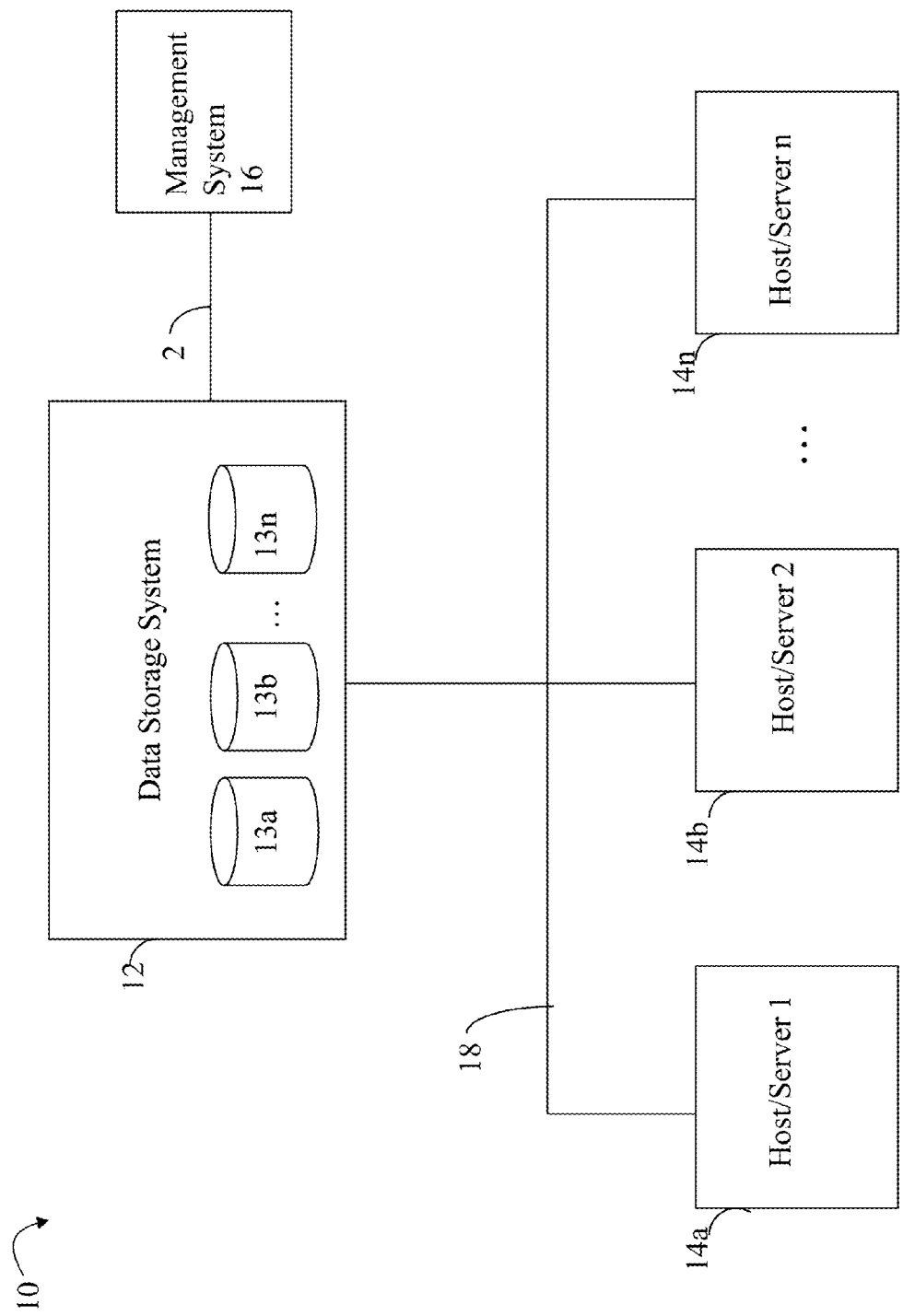
FIGS. 1 and 3 are exemplary embodiments of data storage environments that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

It should be noted that disks may generally refer to physical data storage devices (PDs) which may include rotating disk drives as well as other types of data storage such as using different technologies. PDs may also include, for example, flash-based storage devices, or more generally SSDs (solid state storage devices) as well as other technologies known in the art.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
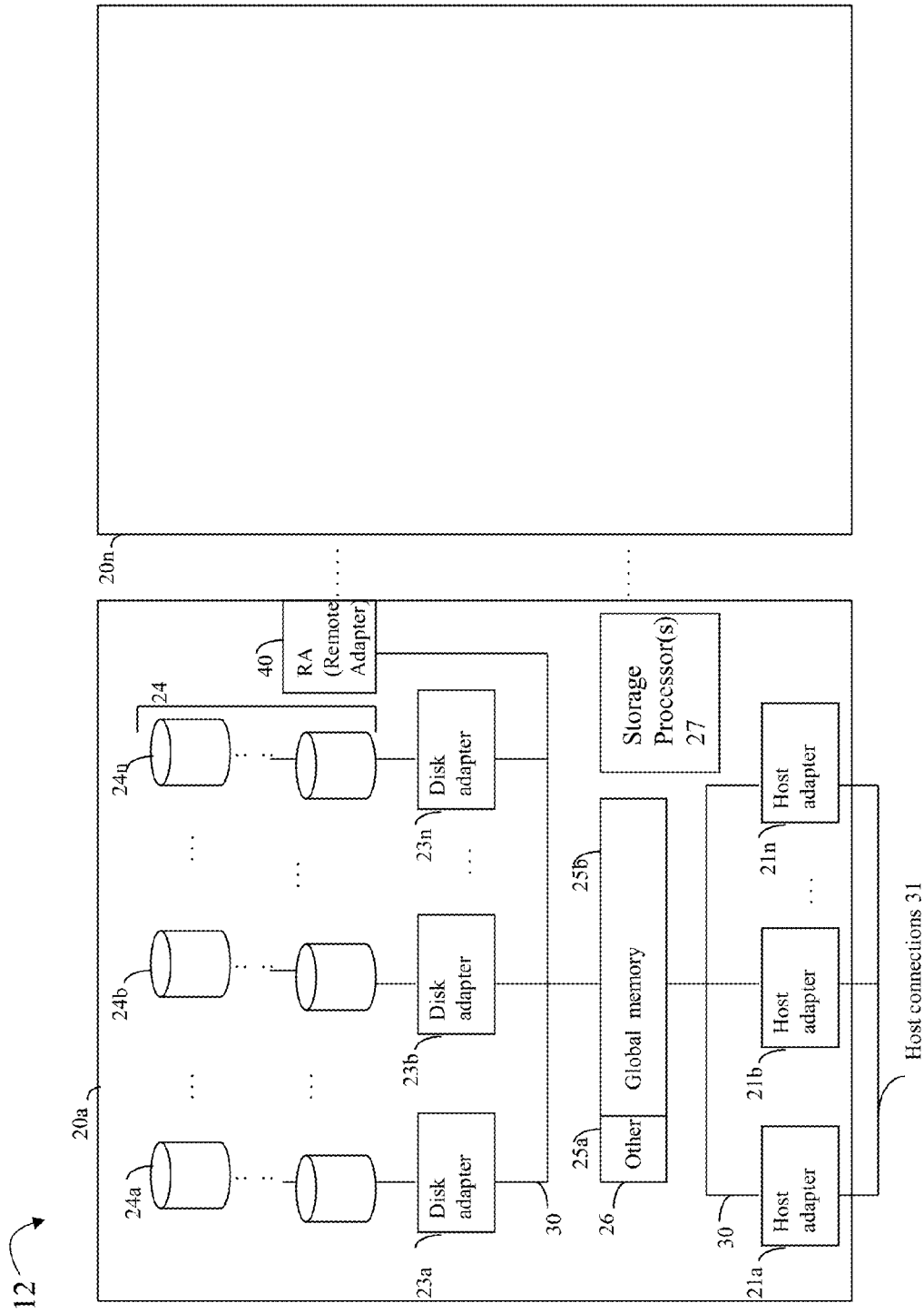
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors (SPs) 27. Each of the storage processors 27 may be CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Management software may execute on the data storage system and/or management system. A client, such as a user interface (UI) of the data storage system management software included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives (e.g., physical devices), and the like.

In connection with the data storage management software, or more generally, any software, various user inputs may be obtained in connection with performing a requested operation. For example, a user may select an operation to be performed in connection with data storage management. The user may also provide additional inputs specifying parameters for the operation using the GUI in connection with performing the requested operation. For example, a user may enter query or search criteria to view selected portions of data storage configuration information regarding a current configuration and state of the data storage system (e.g., list of currently defined LUNs or SGs of LUNs (e.g., an SG may be a logical entity of one or more associated LUNs), and the like), view information regarding storage provisioned for a selected application, and the like.

What will now be described are techniques that may be used in connection with providing a centralized and advanced searching in a data storage environment. The data storage system environment may be a federated environment including one or more data storage systems. Such techniques may be used to provide information to an end user, such as a user of the management software, in an efficient manner regarding a wide variety of different properties in the federated environment. The techniques herein may provide for searching data storage configuration information representing physical and logical entities of one or more data storage systems and applications having storage provisioned on the one or more data storage systems of the federated environment. As will be described in more detail, search criteria may be obtained and used to perform a query across configuration data including representations of different physical entities (also referred to as hardware (HW) components) and logical entities (also referred to as software (SW) components) in the data storage systems. The searching may be performed to determine matches with respect to specified criteria such as matching one or more properties of one or more entities of one or more of the data storage systems. The searching may also be performed based on application content with respect to storage provisioned for one or more selected applications.

The management software's GUI may include UI elements, such as menus, radio buttons, text boxes, and the like, which may be used to specify search criteria to perform a search query. In one embodiment, object-based models may be used. For example, each physical and/or logical entity may be represented by a corresponding object having a set of properties. Each LUN, PD, SG, and the like, may be represented by an object having property values for that particular represented entity. For example, a PD may be a disk having a PD object with properties values based on the physical disk. The disk may have a storage capacity, unique identifier (ID), and type (e.g., FC 10K RPM rotating disk, FC 15K RPM rotating disk, flash or SSD storage device, and the like) where the property values of the PD object are set to denote those particular characteristics for the physical disk being represented.

Figure 3:
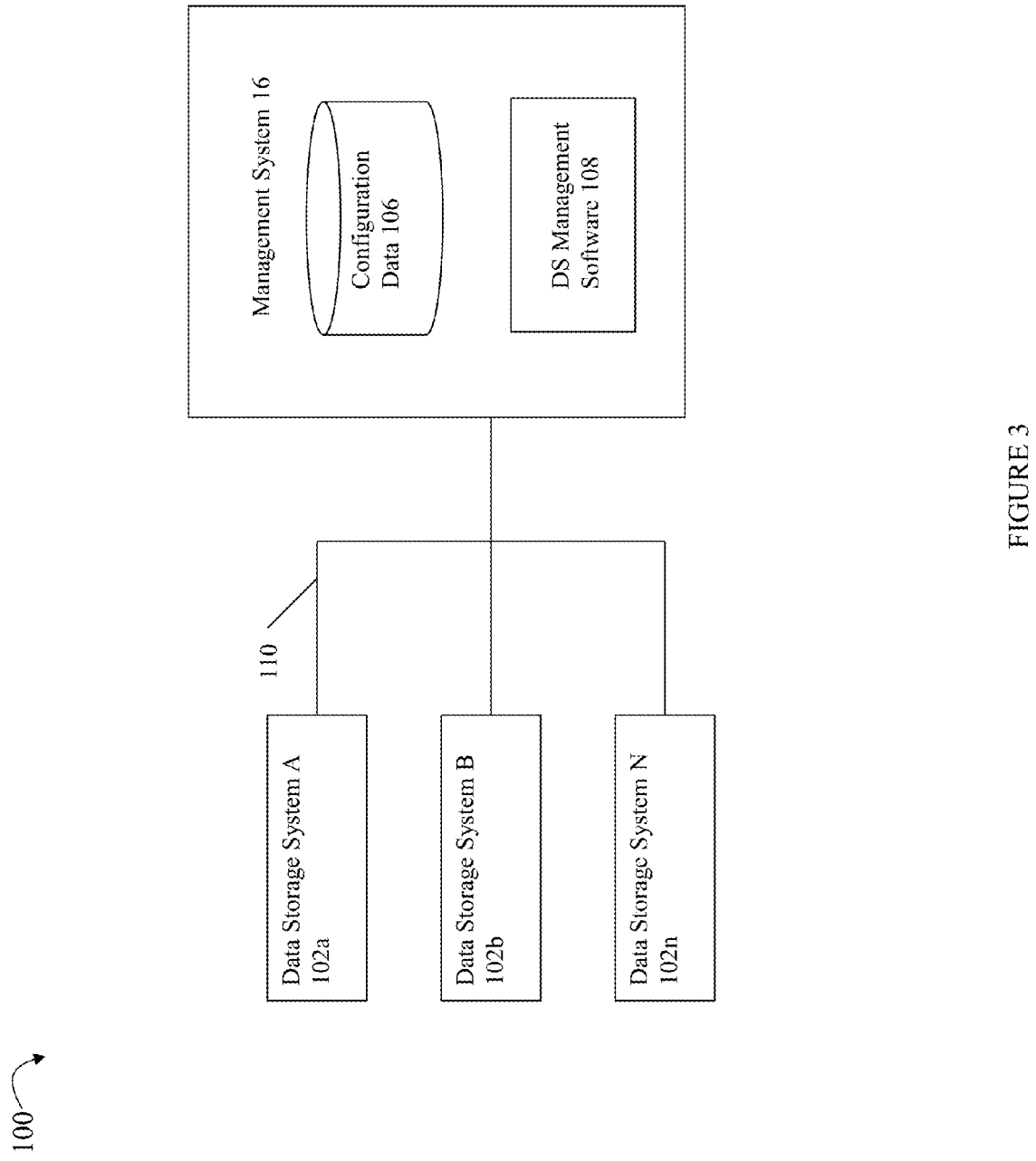

Referring to FIG. 3, shown is an example of a data storage environment that may be used in connection with techniques herein. The example 100 includes data storage systems 102a-n which may be included in a federated storage environment. The data storage system 102a-n may communicate with the management system 16 over connection 110 which may be the internet or other network connection (or more generally any suitable communication connection). Information regarding the configuration of the systems 102a-n may be communicated to the management system 16 and may be stored as configuration data 106. The configuration data 106 may represent aggregated configuration data across systems 102a-n. The configuration data 106 may be used as input to the data storage system (DS) management software 108 to perform searches or queries as described herein.

The configuration data 106 may be obtained and aggregated from the data storage system 102a-n using any suitable technique known in the art. For example, the systems 102a-n may periodically provide updated configuration information to the DS management software 108 which then updates the configuration data 106 with any new or changed information.

Before describing aspects related to searching and search criteria, description is presented regarding one exemplary representation of the configuration data 106. As noted above, an embodiment may use an object-based representation. One embodiment may use tables or other suitable data structures to store the configuration data. For example, a table may include objects of a particular object type. For example, the configuration data may include 3 tables—a first table may include objects representing physical entities which are disks; a second table may include objects represent logical entities which are file systems; and a third table may include objects representing logical entities which are applications. Within each table, a single object instance of a particular type may be represented by a row of data including properties of the object. Each table may include a primary key or index value used to uniquely identify each object or row in the table whereby the primary key, index or identifier (ID) may be a first property of the object.

Figure 4A:
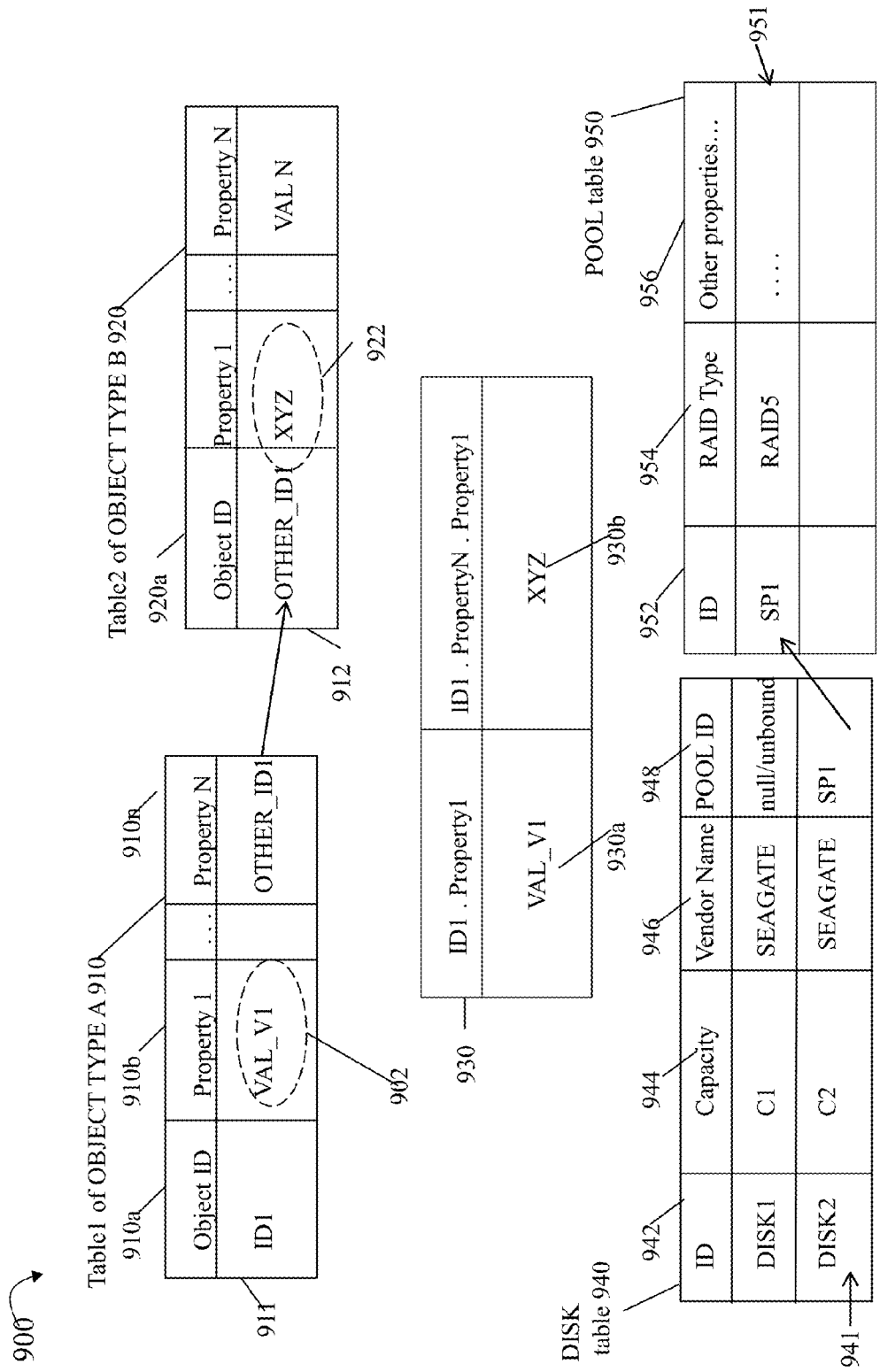
FIGS. 4A, 4B, 6 and 9 are examples illustrating related or associated objects that may be include in configuration data used in connection with techniques herein.

With reference to FIG. 4A, illustrated is an example 900 of how configuration data may be represented in an embodiment in accordance with techniques herein. The example 900 includes tables 910, 920 which provide a generalized representation of object-based configuration data. The table 910 is a first table of objects of type A. The table 920 is a second table of objects of type B. Table 910 includes a first column 910a object ID denoting the primary key or index uniquely identifying each object in the table. Other columns 910b-n denote other properties of the objects of type A. Table 920 is similarly organized. Generally, two or more objects may be related or associated with one another, directly or indirectly, using object properties. Such associations may represent any relationship between objects. For example, a PD or disk may be included in a pool of PDs whereby the PDs are members of a RAID group configuration for the pool. As another example, a first data storage system such as 102a may include a set of PDs. The first data storage system 102a may be represented by a first object and each of the PDs in the set may be represented by another object. The relationship of the set of PDs being included in the first system may be represented using the object model.

With reference to FIG. 4A, row 911 of table 910 may represent a first object and row 912 of table 920 may represent a second object related to or associated with the first object. The foregoing association may be represented using an object property such as 910n which provides a reference or points to object information in row 912. Generally, when performing a query and displaying search results, the search results may combine selected information from the first object 911 and selected properties of the second object 912. For example, element 930 may represent information included in a query results which includes 930a and 930b. Element 930a is the value VAL V1 902, which is the value of property 1 for object 911. Element 930b is the value XYZ 922, which is the value of property 1 for object 912. The foregoing two objects may be related through or using the property N filed 910n. The property "property 1" of object 911 having a primary key of ID1 may be denoted as ID1.Property 1. Another "Property1" 920a of related object 912 (which is related to object 911 through property N 910n) may be denoted as ID1.PropertyN.Property1. The foregoing illustrates a one-level association or relationship between objects 911, 912. More generally, relationships between objects may be through one or more such levels. For example, a property of object 912 may represent an association with yet a third object of a third table. In this manner, object 911 may be represented indirectly to this third object through object 912. Query results may include information from any one or more objects related through one or more levels as just described. Tables 940 and 950 represent more specific examples of object tables. Table 940 may be a table of disks and table 950 may be a table of pools. Each disk includes properties denoted by 942 ID, 944 capacity, 946 vendor name and 948 pool ID. If the disk represented by a row in table 940 is included in a configured pool, property 948 denotes the row in table 950 of the configured pool thereby indicating the foregoing association of the disk being included in the pool. Row 941 may represent object DISK2 which is configured into pool SP1. Pool SP1 has a corresponding object having a row 951 in table 950. The association between 941 and 951 is through pool ID 948. It should be noted that DISK1 in the first row of table 940 has a pool ID of null/unbound denoting that DISK1 has not yet been configured for use into a pool or named RAID group.

It should be noted that each of the objects of type disk and pool may include other properties than as illustrated in FIG. 4A and elsewhere herein. For example, a pool object may include the properties of name, ID, total capacity, allocated capacity, free capacity, state and RAID type.

Figure 4B:
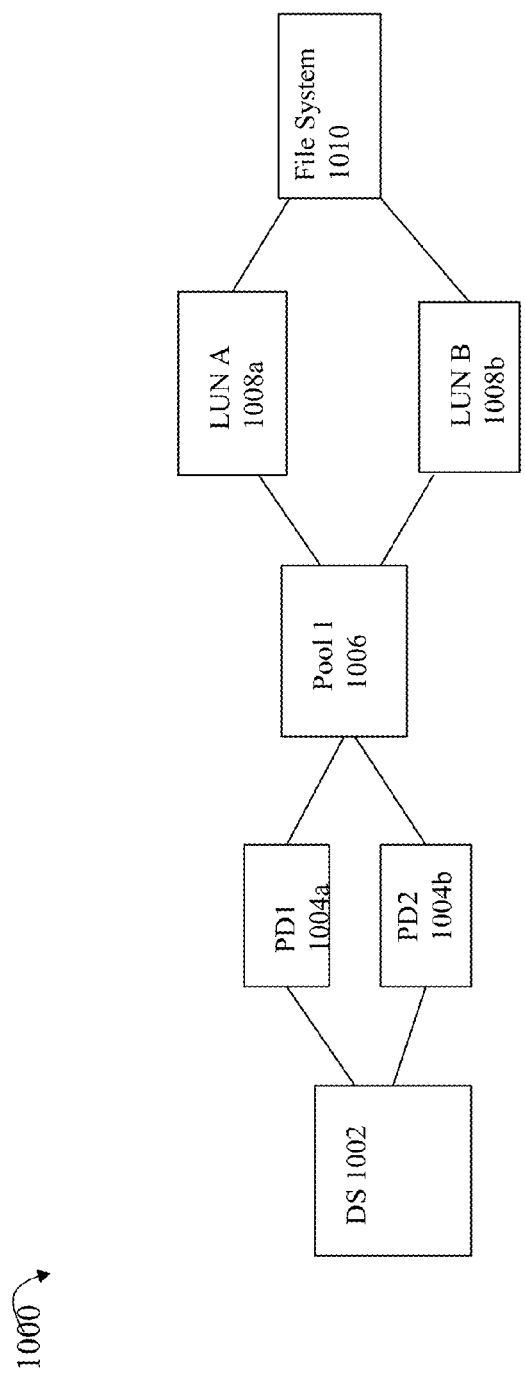
Figure 4C:
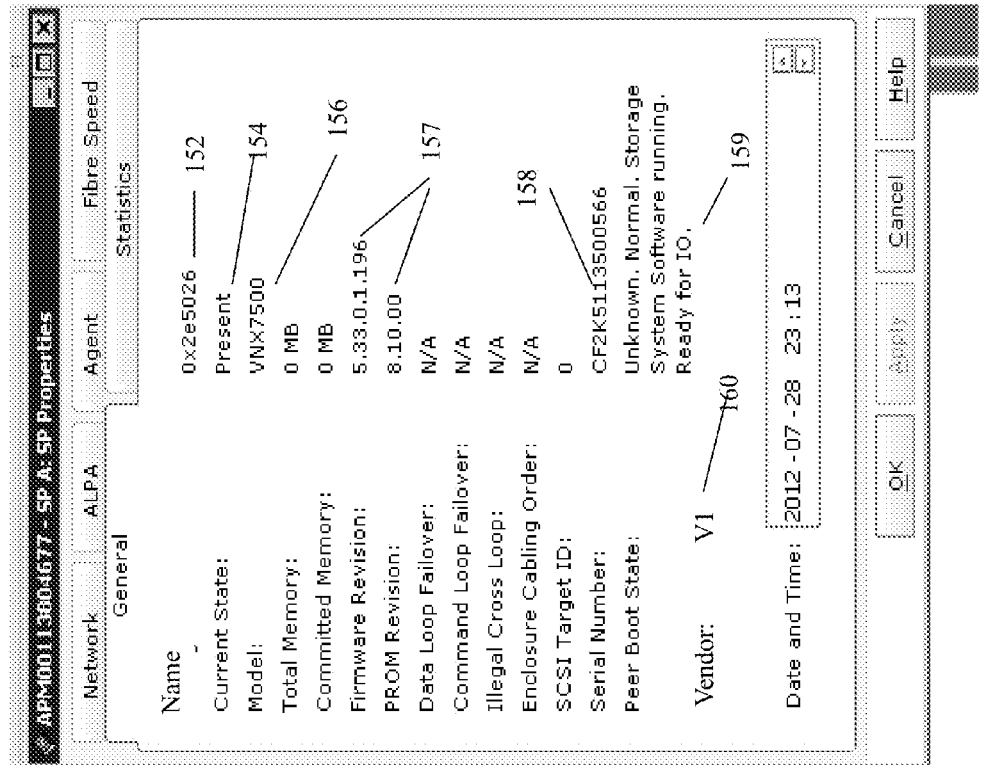
FIG. 4C is an example of properties that may be displayed when providing detailed information about a storage processor in an embodiment in accordance with techniques herein.

FIG. 4B is an example of multiple related objects as may be represented using the object model as described in FIG. 4A. The example 1000 includes data storage system (DS) object 1002, PD objects 1004a, pool object 1006, LUN objects 1008a-b and file system object 1010. The foregoing illustrates a representation of various relationships: a first data storage system represented by object 1002 may include PDs represented by objects 1004a-b. The PDs 1004a-b may be included a configured storage pool represented by 1006. Two LUNs A and B may represented by objects 1008a-b may have storage provisioned from the pool 1006. A file system represented by object 1010 may have its storage provisioned from LUNs A and B (1008a-b). As described elsewhere herein, a query may be performed with respect to storage provisioned for a particular logical entity, such as a file system. The query may include criteria to list all LUNs, PDs, and/or storage pools from which storage is provisioned for the file system 1010. The query may also include criteria to perform a search for a value included in a property or user data where the search is performed with respect to entities associated with storage provisioned for a selected logical entity, such as the file system. For example, a search may be performed with respect to related objects representing storage provisioned for an application to list any objects having any property of a particular value, to list objects with a particular property having a particular value, and the like. The particular property may be a same property included in one or more object types. For example, the property NAME may be common to multiple object types and the search criteria may include searching for NAME=value. Although not illustrated in FIG. 4B, an application (such as a database application executing on one of the hosts or servers as in FIG. 1) may have its files stored in the file system represented by 1010 whereby the application may have an application object associated, directly or indirectly, with file system object 1010. In this manner, a search may also be performed with respect to storage provisioned for the application, for example, to list all PDs providing physical storage for the application, to list all PDs by a particular vendor providing storage for the application, to list all files having a particular owner, and the like.

An embodiment may include objects representing HW components or physical entities as described herein where the physical entities may include, for example, disks or PDs, fans, I/O modules, link control cards (LCC, functioning as the interface between the components within in the data storage system), power supplies, standby or secondary power supplies (such as may be used if the primary power supplies fail), storage processors (SPs) (e.g., processors of the data storage system that process I/O requests), and the like. The physical entities may have common properties such as name, type, vendor name, serial number and state (e.g., representing a current health or state of the component such as present, invalid, faulted, etc. depending on the set of recognized states included in an embodiment). Different physical entities may also have their own unique properties.

For example, referring to FIG. 5C, shown is an example of detailed information that may be presented in a GUI display for a selected SP component. Information displayed for the SP may include a name 152, state 154, vendor 160 and serial number 158 where the foregoing may be common properties to all physical components as noted above. In this example, it should be noted that the common property of type may not be included in the displayed information of 150. Information displayed for the SP may include one or more properties of the SP object which are unique to the SP objects such as firmware revision and PROM revision 157. Additionally, the information displayed for the SP may include data from one or more related objects. For example, element 156 labeled MODEL may represent the model of the data storage system (DS) including this SP whereby the value displayed of VNX7500 may be the value of a property of the DS object. In this example, the data storage system having property 156 may have two SPs. Element 159 may represent status information regarding the second SP paired with this SP (having information as represented in 150). Element 159 may include information based on one or more properties of this second related SP such as regarding the health and/or status of the second SP.

Examples of SW components or logical entities that may be included in an embodiment having corresponding object types may include, for example, a host, pool, LUN, file system, shared folder, share, file, application, mailbox, email, mail folder, clone, mirror, pool, named RAID group, storage group, virtually provisioned (thin) LUN, data base (DB) LUN, log LUN, and the like. A virtually provisioned LUN or device may be a device for which physical storage may be provisioned as portions of the logical address range of the LUN are utilized. In this manner, not all the physical storage capacity or backing physical storage is allocated when the LUN is initially provisioned. As data is stored to a particular logical address of the thin LUN, storage may be allocated and mapped to that logical address.

A pool may be a group of physical devices included in a RAID configuration such as RAID-0, RAID-1, RAID-5, RAID-6 and the like. A pool may be configured to have a desired associated performance level (e.g., high, medium, low) whereby a particular RAID configuration/level (e.g., RAID-0, 1, 5, 6) and underlying PD technology or drive type may be selected with a goal of the different relative performance classifications. For example, a FAST high performance pool may be configured of flash PDs or more generally SSDs (non-rotating disk drives) having a RAID-5 configuration. An INTERMEDIATE pool may be configured of FC 15K RPM disk drives having a RAID-5 configuration. A SLOW pool may be configured of SAS or SATA disk drives having a RAID-6 configuration. The performance characterization of a particular pool as FAST, or high performance, and the like, may be included as a property of the pool. A named RAID group is similar in respects to a pool in that it is a group of PDs configured in a particular RAID configuration. However, a named RAID group may not have an associated performance goal or related classification as a property of the named RAID group object. Others of the foregoing entities are described in more detail in following paragraphs.

Objects representing SW components or logical entities may include one or more common properties. In one embodiment, the NAME property may be common to all objects representing logical entities. In this embodiment, the NAME property may more generally be a common property of all objects (e.g., common to objects representing all/any SW and HW component).

Figure 5:
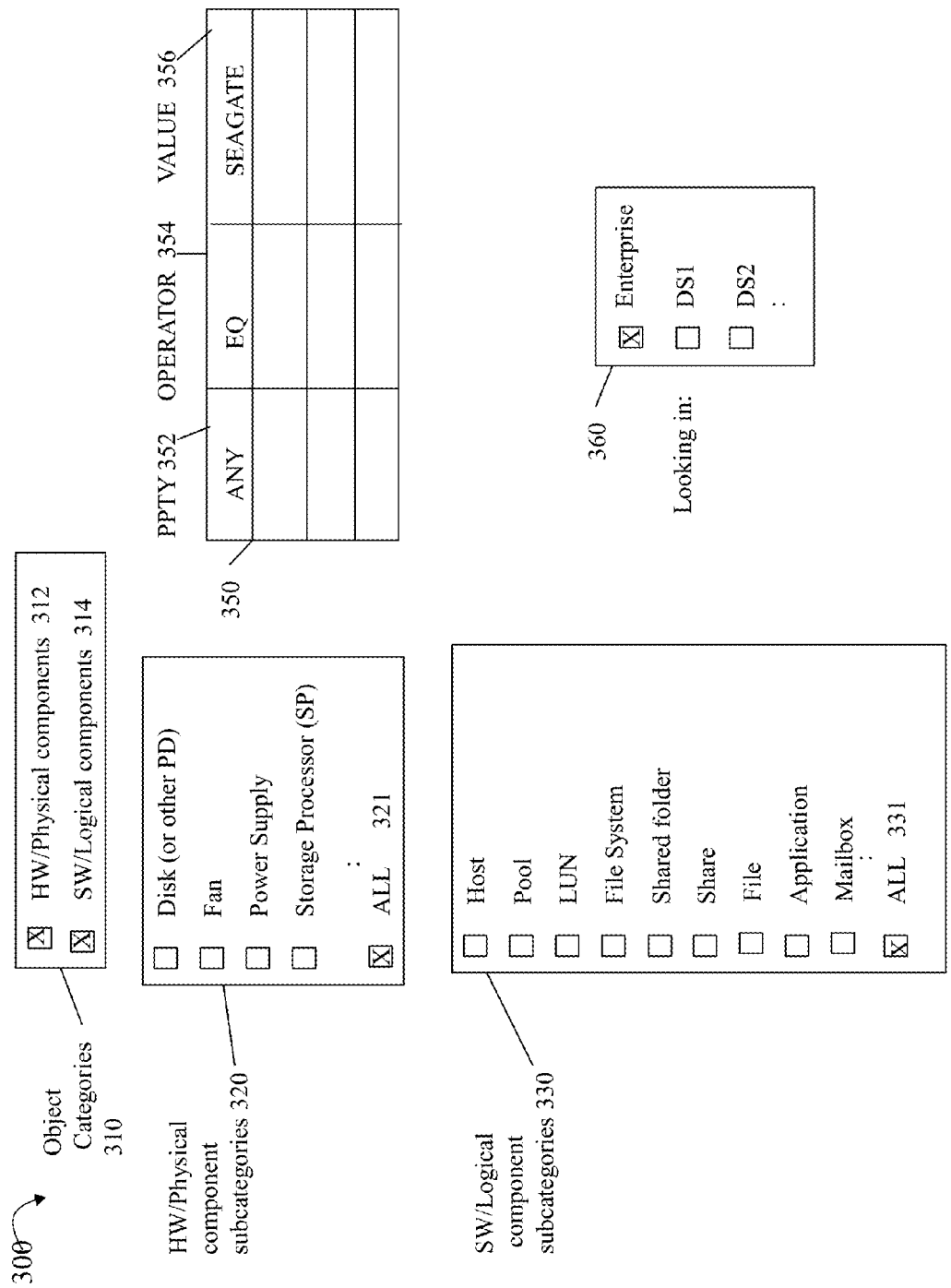
FIGS. 5, 5A, 5E, 5F, 6A, 6B, 6C, 6D, 8, 8A and 10 are examples of user interfaces including search criteria that may be used in an embodiment in accordance with techniques herein.

Referring to FIG. 5, shown is an example of information that may be included in a GUI in an embodiment in accordance with techniques herein. The example 300 includes UI elements that may be used in providing search criteria for searching aggregated configuration data across the federation, such as for one or more data storage systems. An embodiment may provide for selection criteria where the user may limit the scope of object types based on general categories 310 of HW components/physical entities 312 or SW components or logical entities 314. In this manner, objects of the configuration data representing physical and logical entities of the data storage systems may be generally partitioned into the foregoing two categories or classifications 312, 314. An embodiment may provide UI elements which allow a user to select one or more of the categories of 310. In this particular interface, selection of one of the categories of 310 indicates that objects of that general category are included in the search domain. In this example, 312 and 314 are selected thereby indicating that objects of both categories are included in the search criteria. Elements 320 and 330 provide additional search criteria by which a user may further specify what types of objects in each of the general categories 312 and 314 are included in the search domain. If element 312 is selected, the menu or list 320 may be enabled or presented to the user thereby allowing the user to further select one or more types of objects representing different physical entities or HW components included in the search domain. In this example, the user has selected ALL 321 thereby indicating that ALL object types for all physical components are searched. As another example, a user may have selected one or more of the particular types of subcategories of 320, such as disk or fan, and the searching would be limited to objects of those selected types. If element 314 is selected, the menu or list 330 may be enabled or presented to the user thereby allowing the user to further select one or more types of objects representing different logical entities or SW components included in the search domain. In this example, the user has selected ALL 331 thereby indicating that ALL object types for all logical entities or SW components are searched. As another example, a user may have selected one or more of the particular types of subcategories of 330, such as host or file system, and the searching would be limited to objects of those selected types.

Element 360 provides an option whereby a selection may be made to limit searching to objects representing entities in selected data storage systems of the federation. For example, DS1 and DS2 as listed in 360 may correspond, respectively, to first and second data storage systems included in the federation. However, in this case, Enterprise has been selected thereby indicating that the search is performed with respect to all data storage systems of the federation. As another example, if DS 1 is selected in combination with the criteria selected in 310, 320 and 330, searching is performed with respect to entities for only the first data storage system.

Element 350 represents search criteria whereby a user may specify one or more particular properties and corresponding values. Each row of table 350 may include 3 elements: a property (ppty) 352, operator 354, and value 356. The property 352 may identify any property for any of the selected object types represented by 310, 320 and 330. In one embodiment, a menu may be presented to the user from which a selection of a valid property may be made based on the particular object types selected within 310, 320 and 330. For example, if only 312 and 320 disk are selected, then valid properties presented for selection to the user may include only disk object properties. The operator parameter 354 indicates an operation that acts on the property parameter 352 in the same row. Example operator parameters include: equal to (=, or EQ), less than (<), greater than (>), less than or equal to (<=), greater than or equal to (>=), not equal to (!=), and LIKE. The LIKE operator parameter may be used when the parameter 352 and the value parameter 356 are both strings and compares the strings by pattern matching. LIKE may be used to locate the pattern denoted by the value parameter within the indicated property field (e.g., pattern may also denote a substring of the property).

The value parameter 356 establishes a bound for the operator 356 to act on the property 352 in the same row. The value parameter 356 may be in various forms depending on what the corresponding property is. Example value parameters 356 include integers (e.g., 1, 50, 543, etc.), Booleans (e.g., true, false), and strings (e.g., RAID 5, NEW, old, and the like).

In this manner, each row of 350 represents a logical expression. If there are multiple rows in the table 350, logical expressions represented by the rows may be logically OR'd together so that the first logical expression represented by the first row is logically OR'd with the second logical expression represented by the second row, and so on. Although not illustrated, an embodiment may provide other UI elements which allow the user to specify whether logical expressions corresponding to rows of the table 350 are logically OR'd or ANDed together.

With reference to 350, an embodiment may also allow for specifying a Property of "ANY" denoting that the specified value may match ANY property of any object included in the search domain. For example, the search criteria denoted by 310, 320, 33, 350 and 360 indicate to search for the string "SEAGATE" in any property of any object representing a physical or logical entity across the entire federation.

Figure 5A:
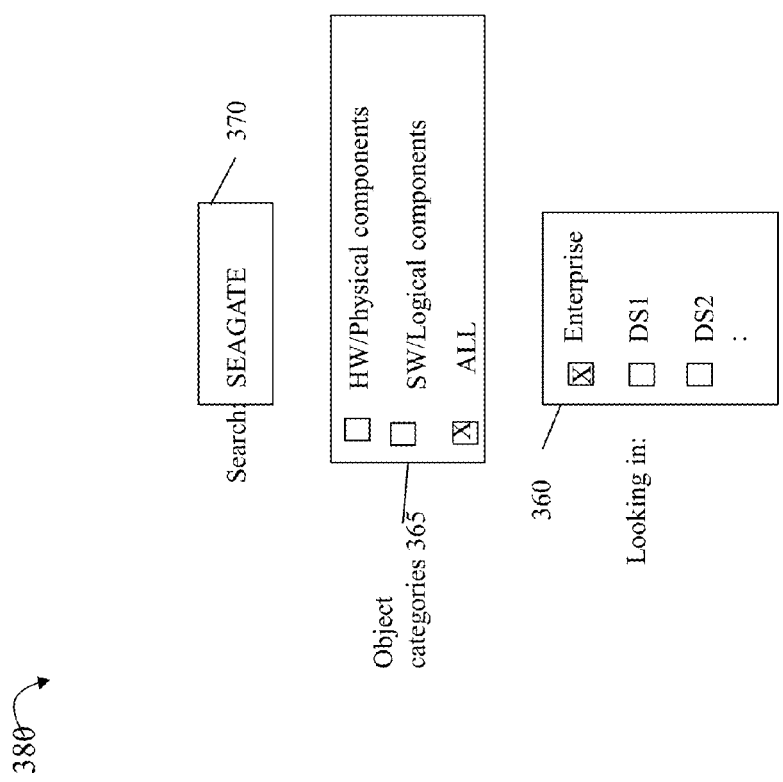

Referring to FIG. 5A, shown is another GUI that may be presented to the user to enter search criteria. The display of 380 may be a simplified alternative to the UI displayed in FIG. 5. The example 380 includes a search text box 370 where the user may enter a string or other value used as query term. Thus, element 370 may be characterized as an alternative way of obtaining the same search criteria as represented by the single row "ANY EQ SEAGATE" of table 350. Element 365 may be a menu from which the user may select to search ALL object categories within the entire federation (as indicated by the selection of Enterprise in 360).

It should be noted that an embodiment may provide functionality for saving search criteria such as specified using a GUI as in FIG. 5. In this manner, a user may enter a first query and subsequently retrieve the saved query and criteria for reuse at a subsequent point in time. A saved query that is retrieved may also be further modified and save as a new query or replacement for the previous query. An embodiment may associate a unique query name or identifier with a search query and criteria. This unique name or identifier may be referenced to later retrieve a saved query. In a similar manner, an embodiment may provide default or predefined sets of search criteria that the user may reference and also customize.

With reference back to FIG. 5, based on the search criteria of 310, 320, 330 and 360, all properties of objects representing physical and logical entities on all data storage systems of the federation are searched.

Figure 5B:
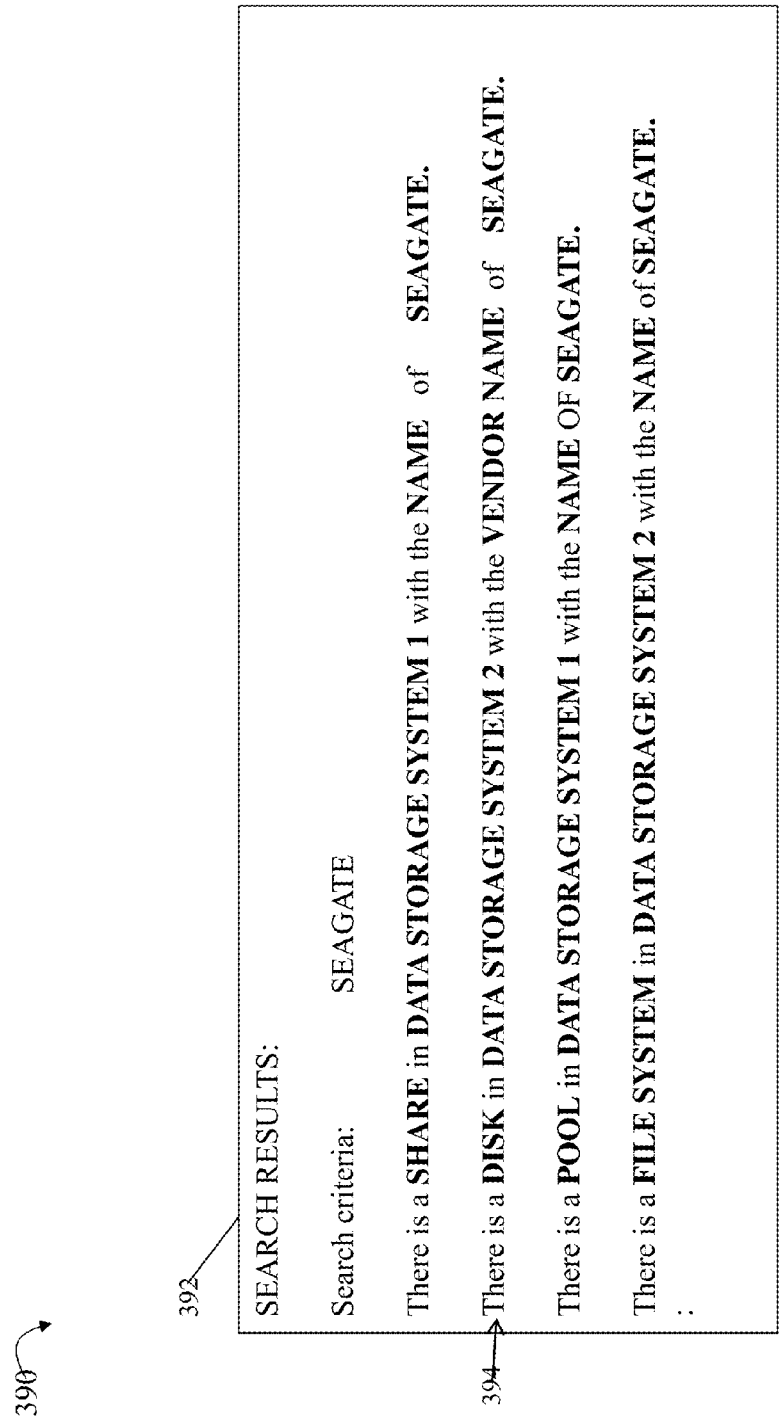

Referring to FIG. 5B, shown is an example of query results that may be initially displayed to a user based on the search criteria specified in FIG. 5. The search results 392 indicate that the query term "SEAGATE" had 4 matches: the NAME property of a share in DS1, the VENDOR NAME property of a disk in DS2, the NAME property of a pool in DS1, and the property NAME of a file system in DS2. In this manner, the user is provided with query results of configuration data for the entire federation. In displaying search results, an embodiment may also choose to highlight or annotate the search results in any suitable manner to denote the values of the one or more properties which match the text string. For example, the displayed search results may display the search term as it appears in each property as bolded text, highlighted text, a particular color, or other technique that may visually distinguish the search term as it appears in the displayed query results. As also shown in FIG. 5B, the displayed results may annotate or highlight other words denoting the property and object in which the query term is located.

In addition to that as illustrated in FIG. 5B, an embodiment may provide for different options in connection with filtering and/or viewing query results. For example, the query results may alternatively be displayed in tabular form as in FIG. 5C and may include, with respect to each object having a property matching the search criteria, the object type, data storage system including the component represented by the object, the property matching the term SEAGATE, and optionally one or more other selected properties about the matching object. An embodiment may allow the user to further view or sort the query results such as by selection of one of the column headers 395b-d. An embodiment may also include other properties not illustrated in FIG. 5C, such as object creation date, and may similarly provide for sorting based on values for a selected property. An embodiment may sort the search results based on the last time the objects were accessed or otherwise selected for use with searching by the particular user. If search results relates to multiple applications, the search results may be displayed for the different applications.

An embodiment may also display only a portion of the search results such as the first N matches (N being an integer >1). N may be configurable by the user and/or system. For example, one embodiment may display enough of a search result to populate one screen of a display device with an additional message that more results are available. A user may also be provided with an option to display all of the query results.

Figure 5D:
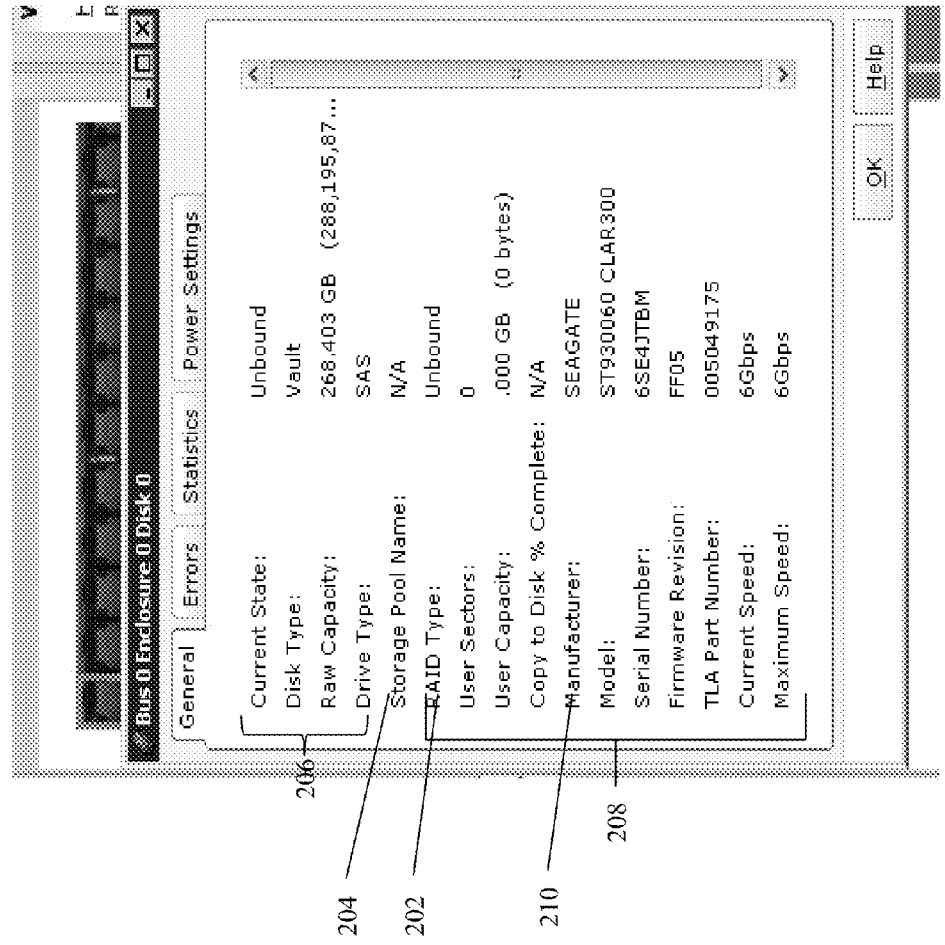
FIG. 5D is an example of properties that may be displayed when providing detailed information about a disk or physical storage device in an embodiment in accordance with techniques herein.

In response to displaying query results as either in connection with FIG. 5B or 5C, a user may select to view one of the located objects. For example, a user may select the disk matching the search criteria by selected an element from the list as denoted by 394 of FIG. 5B and 395a of FIG. 5C. In response to the selection, detailed information about the selected disk object may be displayed as in FIG. 5D. Elements 206 and 208 denote properties that may be included in the disk object. For example, element 210 may represent the matching property included the value SEAGATE. Element 204 may represent a property value of a related storage pool (POOL) object. In this case, the disk described by the information of 200 has not yet been configured or bound for use with any storage pool as denoted by RAID type 202. If the disk was included in a RAID group (such as associated with a configured storage pool or named RAID group object) having a particular RAID level or configuration, the RAID type 202 would have a value reflecting the RAID configuration of the RAID group including the disk.

Figure 5E:
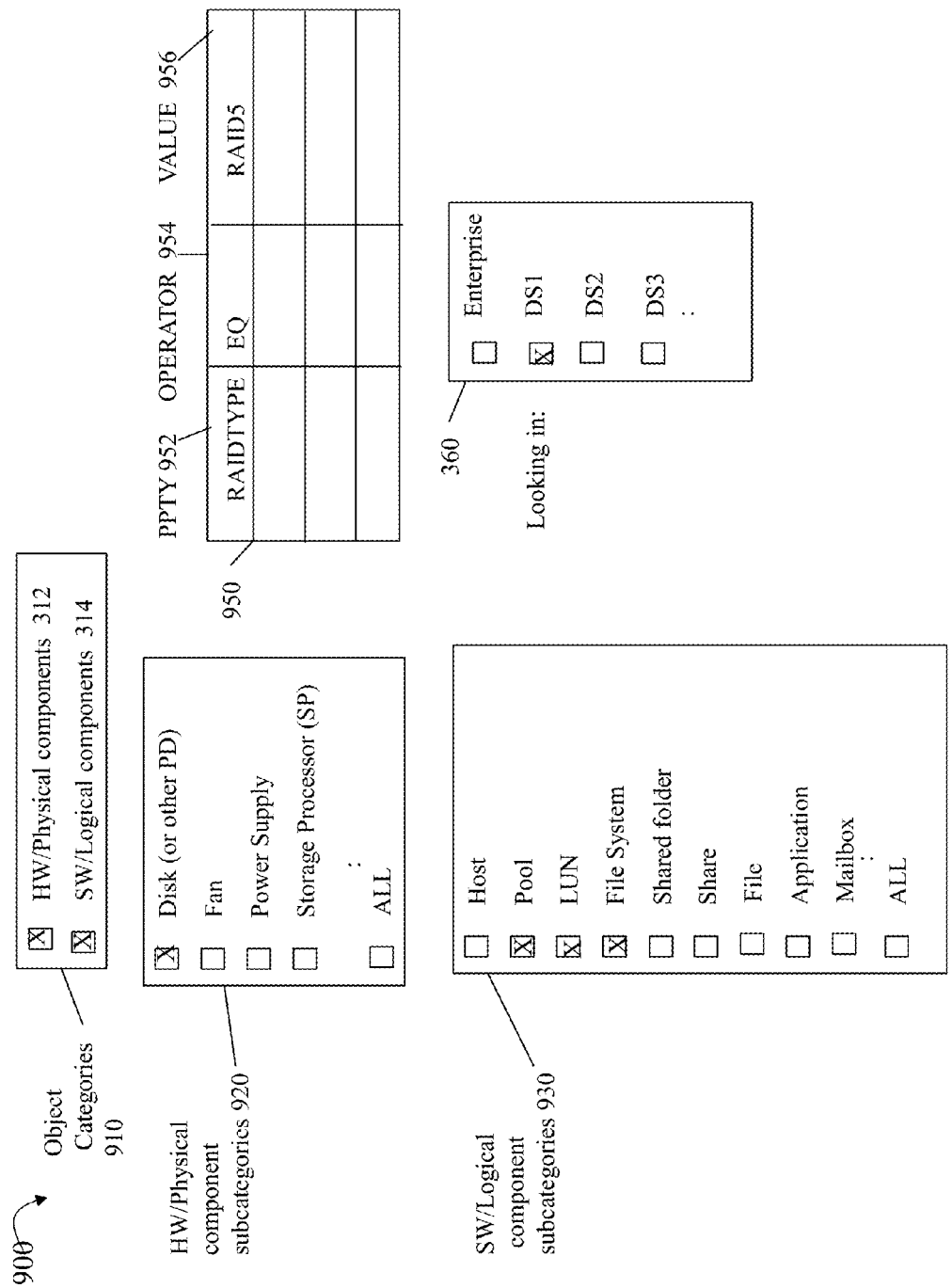

Referring to FIG. 5E, shown is another example of information that may be displayed in a GUI including search criteria. The GUI of the example 900 includes UI elements similar to those as described in connection with FIG. 5. In the example 900, search criteria is specified to search all disks, pools, LUNs and file systems in DS1 (e.g., see element 360) having a RAIDTYPE of RAID5 (denoting a RAID-5 configuration).

It should be noted that an embodiment may allow for specifying properties in 952 of table 950 which are included in the selected object types as described above. Additionally, an embodiment may allow specifying one or more other properties in 952 which are not actually included in one of the selected object types denoted in 910, 920 and 930 but where the selected property is actually a property of a related or associated object type. In this manner, the criteria of the example 900 may search pools, LUNs, file systems and disks which either have a property of RAID type=RAID5 or where such a property value is included in a related object. Assume that RAID TYPE is a property common to Pool and LUN object types but not a property of disk or file system objects. When performing a search including objects and related objects, the criteria of FIG. 5E may return a list of all Pools having a RAID-5 configuration (the property RAID type being included in the pool object as illustrated in FIG. 4A), LUNs configured from RAID-5 groups (the property RAID type being included in the LUN objects), file systems configured from RAID-5 groups (file system configured from either an associated pool or named RAID group having RAID type=RAID5) and disks included in a RAID-5 configuration (disks providing physical storage for associated pools or named RAID groups having a RAID-5 configuration). In this case, the selected object types denoted by 910, 920 and 930 may denote the object types having the property value RAIDTYPE=RAID5 or having a related object with the property value RAIDTYPE=RAID5. As described elsewhere herein such as in connection with FIGS. 4A and 4B, an associated or related object having this property may be associated through one or more levels (e.g., associated through properties of one or more objects). The query results may include objects of any of the selected types denoted by 910, 920 and 930. For example, the query results returned in connection with the criteria specified in the example 900 may identify a single pool P1, the LUNs and PDs included in the configured pool P1, and two file systems FS1 and FS2 having their storage provisioned from pool P1.

An embodiment may provide a searching option to enable or disable searching properties of related or associated objects such as described in connection with FIG. 5E. It should be noted that if the option to search related or associated objects is disabled or is otherwise not included in an embodiment, a user may not be allowed to select DISK in 920 and file system in 930 in combination with the RAID TYPE property of 950. Alternatively, an embodiment may allow selection of DISK in 920 and/or file system in 930 as illustrated but such selection may not affect the search domain when related object searching is enabled such objects do not have the RAIDTYPE property.

Figure 5F:
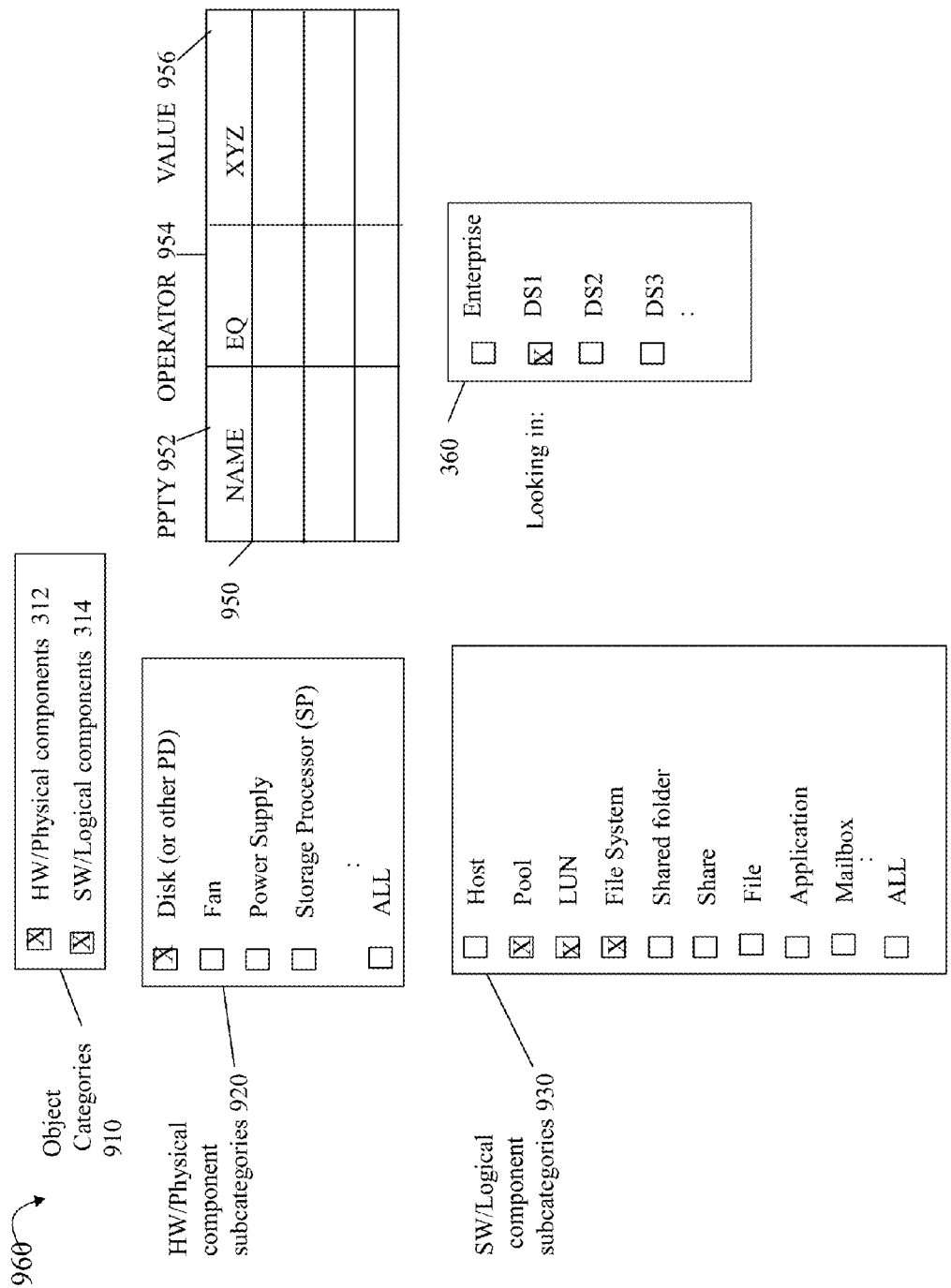

Referring to FIG. 5F, shown is another example of information that may be displayed in a GUI including search criteria. The GUI of the example 960 includes UI elements similar to those as described above (such as in connection with FIGS. 5 and 5E). In the example 960, search criteria is specified as in FIG. 5E with the different of table 950 denoting a property NAME=XYZ. The example 960 therefore specifies search criteria to search all disks, pools, LUNs and file systems in DS1 (e.g., see element 360) having a NAME field of XYZ. In one embodiment as described herein, NAME may be property common to all objects and represented entities in the configuration data (e.g. in each object representing either a HW component or a SW component). The criteria of 960 specifies to search objects representing all pools, LUNs, disks and file systems in DS 1 where the property NAME is "XYZ". The query results may include any objects of the foregoing types having a NAME property of XYZ.

It should be noted that an embodiment having an option to enable implicit searching of objects associated with or related to those objects denoted by 910, 920 and 930 may also include in the search results, for example, a first file system having a file or folder/directory with the NAME=XYZ. Thus, although the file or folder itself (related object containing the matching NAME "XYZ") may not be listed in the search results (due to the particular selections in 930), the first file system may be listed in the search results with a message that it contains a file or folder with the NAME "XYZ".

An embodiment in accordance with techniques herein may provide for configuration and provisioning of storage customized for a particular application. For example, due to typical or expected usage of data for a particular application, one or more of the SW or logical entities may be configured in a particular manner. For example, if an application is expected to perform many more writes than reads such that the application execution profile may be characterized as write-heavy, storage for the application may be provisioned from RAID-1 or RAID-5 groups (e.g., such as from a pool or named RAID group having a RAID-5 configuration) rather than from a RAID-6 group (e.g., such as from a pool or named RAID group having a RAID-6 configuration). As will be appreciated by those skilled in the art, this may be due to the additional operations expected in connection with writing the additional parity data for RAID-6 vs. the RAID-5 or RAID-1 configuration. If the application uses a particular file system and associated protocol, the file system for the application may be configured to use the appropriate file system and associated protocol, such as NFS (Network File System) or CIFS (Common Internet File System). If the application is very I/O intensive and is classified as a critical application for which response time and generally performance is very high, the PDs used to store the application's data may also be of a type and technology expected to provide high performance for write I/Os. Thus, the application and its associated components may be customized for the particular application.

Figure 6:
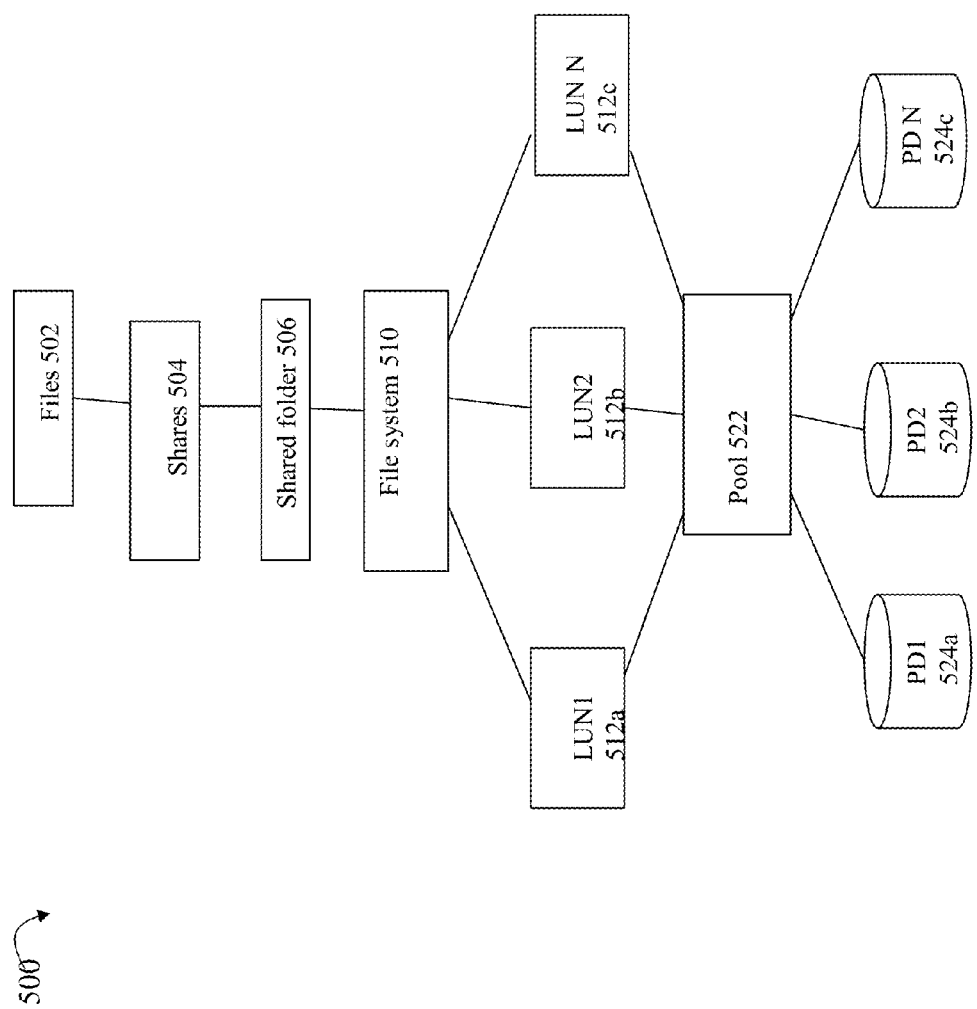

In connection with techniques herein, an embodiment may represent the foregoing using objects in the configuration data, such as described elsewhere herein (e.g., in connection with FIG. 4B). For example, with reference to FIG. 6, consider a medical office application have requirements as just described. The example 500 illustrates a representation of objects that may be created in the data storage system for files used by the application. The lines connecting the objects may represent associations or connections between related objects. PDs 524a-c may be disks (or more generally storage devices) such as SSDs configured into a pool 522 such as a RAID-5 group. LUNs 512a-c may be configured from pool 522. File system 510 may be configured using LUNs 512a-c. The file system 510 may include one more shared folder 506. Each such shared folder may include one or more shares 504. Files 502 may include data for the medical application (MED APP) from storage provisioned on PDs 524a-c.

As known in the art, shared folders provide configurable containers for file-based storage and are associated with a specific quantity of storage resources. Shares represent the network-mount points through which network clients or hosts access file-based storage. A data storage system may be configured to have one or more shared-folder servers that manage file systems for shared folders. A shared folder server uses either CIFS or NFS protocol to catalog, analyze and transfer files within designated shares and uses either the CIFS or NFS file sharing protocols to transfer data to and from hosts. A shared folder is a storage resource that provides access to individual file systems for sharing files and folder. A shared folder may contain shares which transfer data according to a particular file protocol, such as CIFS or NFS). As noted above, a share is a named mountable instance of shared-folder storage accessible through a shared folder. Each share is accessible through the protocol (NFS or CIFS) defined for the shared folder where the share resides.

Shares may also provide access to other types of storage resources besides a file system on the storage system that may be application specific. For example, another type of storage resource may be a VMWARE data store used by hosts running one or more virtual machines. In connection with some embodiments, one or more applications may executed in a virtualized environment on a host system. For example, the host may have one or more virtual machines executing on a single physical machine in a virtualized environment using virtualization software such as produced by VMware, Inc. In the context of each virtual machine, one or more virtual applications may be executed, where the virtual applications may include, for example, an email application such as Microsoft Exchange, or a database application. The virtual application may issue an I/O operation to the data storage system where the data or I/O path includes the VMware stack. In this manner, the virtual applications executing in the context of the virtualized environment such as VMware may store data on the data storage system. A logical entity referred to as a VMware data store may be associated with storage used by the virtualized environment on the host and may be suitably configured for use with storing data for the virtualized environment.

Shared folders and shares provide file-based storage resources that hosts, such as Window-based and Linux/UNIX hosts, can access over network connections. A shared folder is a filed based storage resource that is associated with a particular quantity of storage and file access protocols. When file-based storage is enabled, a shared folder server maintains and manages file systems for shared folders and transfers data to and from hosts using CIFS or NFS file-sharing protocols. The type of access depends on whether the share is a CIFS or NFS share. When a shared folder server is created on a storage system, the CIFS protocol, NFS protocol, or both, may be enabled on the server. Even if both protocols are enabled on a shared folder server, it should be noted that an embodiment may allow only for the creation of single-protocol shared folders. When creating a first shared folder on the server, the CIFS protocol may be selected. When creating a second shared folder on the server, the NFS protocol may be selected.

In this manner, an embodiment may use the objects related to an application to perform searching based on application content or storage provisioned for the application. The query results may relate to the storage provisioned for the application (e.g., objects associated with storage provisioned for the application).

Figure 6A:
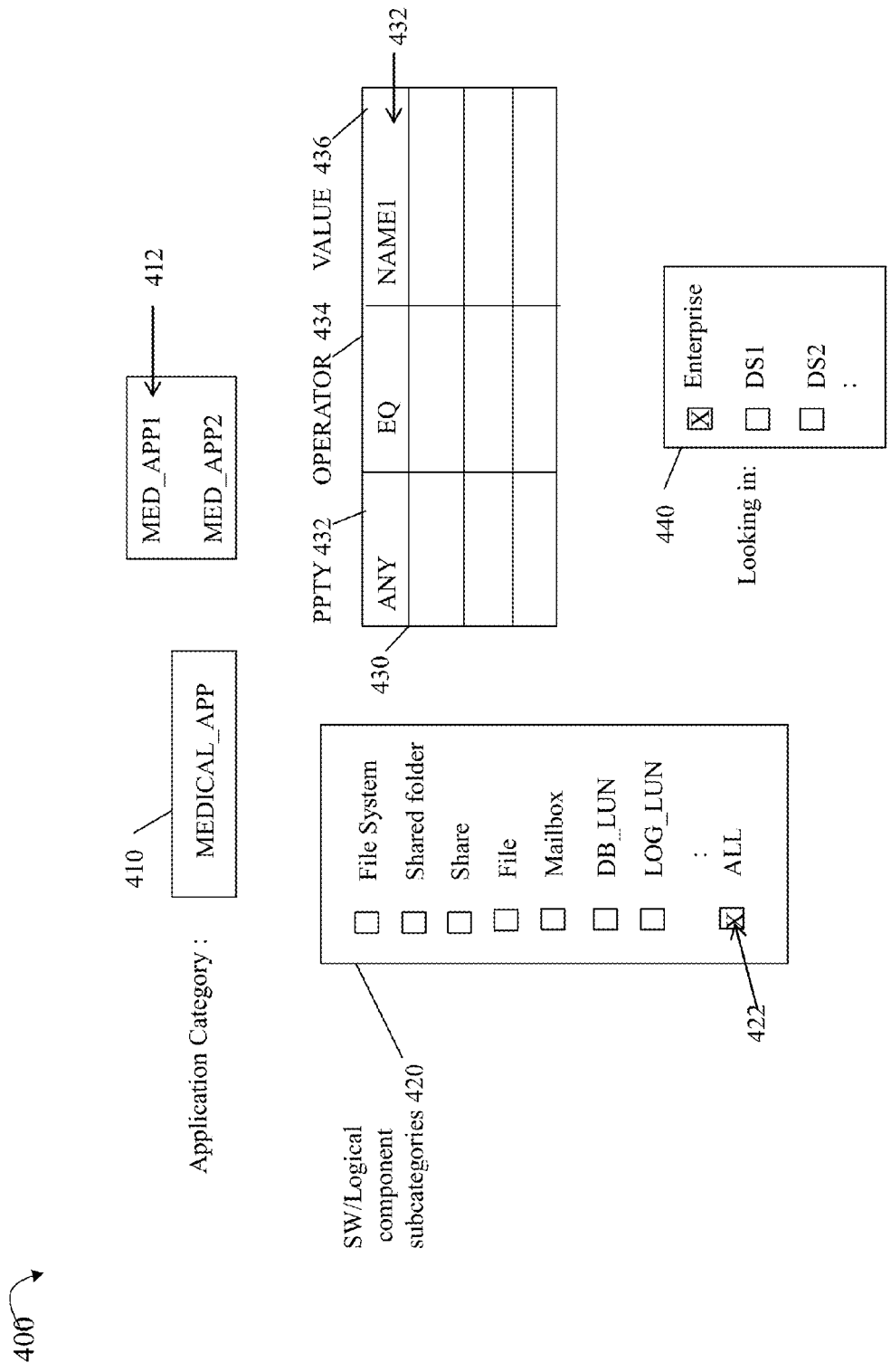

With reference to FIG. 6A, shown is an example of information that may be included in a GUI displayed in an embodiment in accordance with techniques herein. The example 400 includes a GUI that may be used in connection with searching based on application contents or storage provisioned for a selected application. In this example, the user may select a particular application category, such as MEDICAL_APP denoting one of possibly multiple supported classes of applications supported. Other categories or classes of applications may include email applications, database applications, legal applications, and the like. For example, EXCHANGE (denoting Microsoft Exchange) and VMWARE may be two other supported application categories form which a selection may be made in 410. In response to selecting a particular application category in 410, element 412 may be displayed which includes a list of particular instances of the selection application category. For example, two different instances (MED_APP1 and MED_APP2) of the same medical application MEDICAL_APP may have their data stored on the data storage system or federation. A different application object may be associated with each such application instance.

With reference to 412, the first application instance MED_APP1 may be selected for which content-based searching is performed.

A GUI may include UI elements from which a user may select to search particular HW and/or SW components such as described elsewhere herein. In the example 400, a menu 420 may be presented listing SW components or logical entities from which a user may select to perform content-based searching for MED_APP1. Element 422 is selected indicating that objects for ALL SW components related to storage provisioned for the application MED_APP1 are searched. Element 440 indicates that the search is with respect to storage provisioned for MED_APP1 in entire federation or enterprise (rather than just one or more selected data storage systems). Table 430 represents search criteria using properties and values as described above in connection with other figures. Table 430 includes ANY EQ NAME1 denoting to search for the string "NAME1" in any/all properties of all selected object types denoted by 422 with respect to storage provisioned for MED_APP1. Assuming the representation of objects in FIG. 6, example 400 includes search criteria that searches for "NAME1" in ALL properties of ALL object types associated with provisioned storage for MED_APP1. For example, a search is performed for the string "NAME1" in any property of an object representing a file, share, shared folder, file system, LUN, pool or PD from which storage is provisioned for MED_APP1. To further illustrate, NAME is a common property across all objects. "NAME1" may match the name property of a file system used by MED_APP1, the name property of a shared folder including files for MED_APP1, a name property of a first file stored in DS1 and a name property of second file stored in DS2.

Figure 6B:
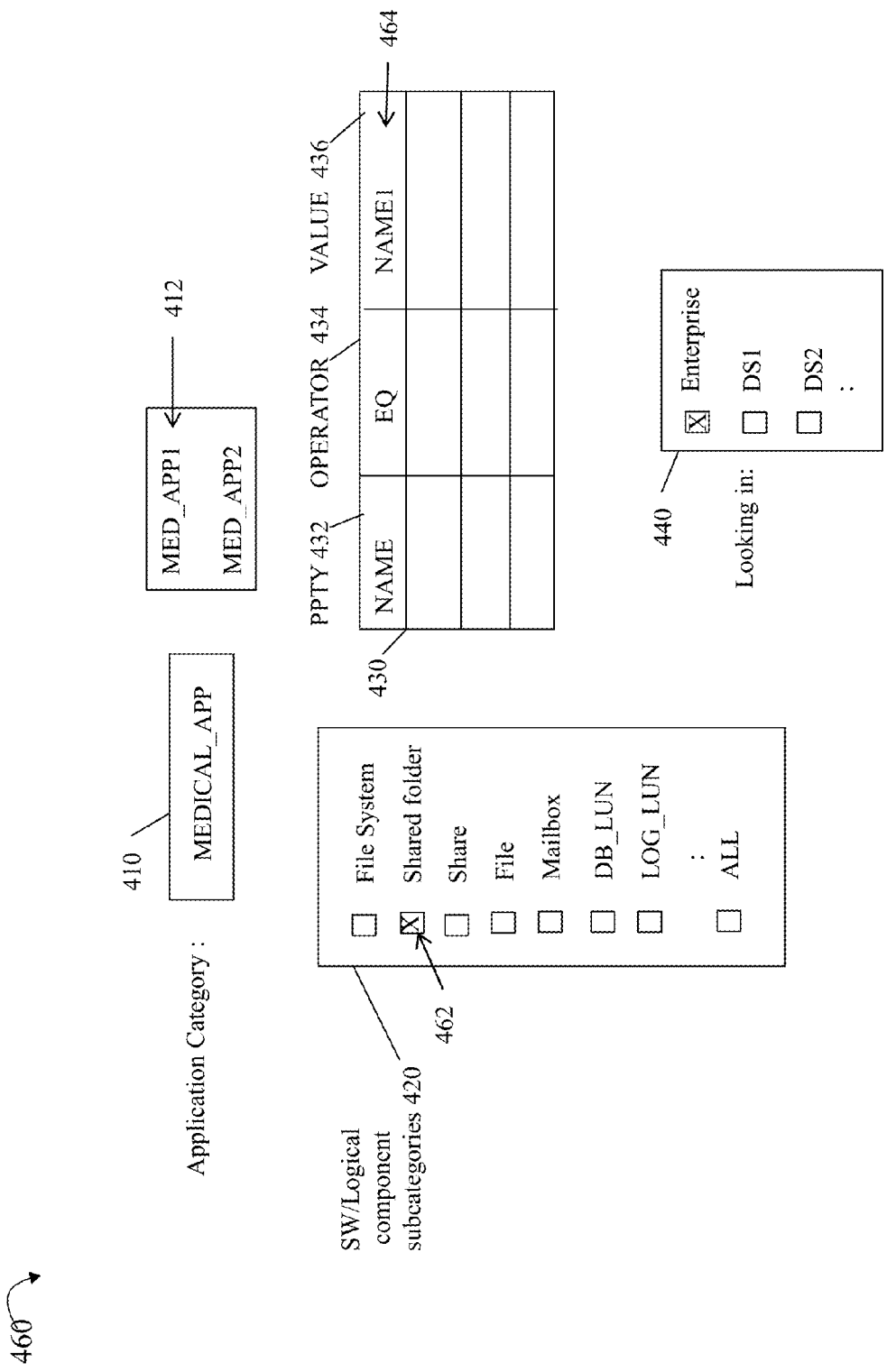

Referring to FIG. 6B, shown is another example of search criteria that may be used in connection with performing a content-based search for MED_APP1. FIG. 6B includes elements similar to as described in connection with FIG. 6A with the difference that table 430 denotes different search criteria than in FIG. 6A and only shared folders are selected from menu 420. Element 420 indicates that searching is performed with respect to only shared folders created for or used by MED_APP1. Element 430 indicates to search for the value "NAME1" in the common property NAME of all shared folders. The example 460 may be characterized as providing search criteria to further limit the searching described in connection with FIG. 6A. As described above, "NAME1" may match the name property of a file system used by MED_APP1, the name property of a shared folder including files for MED_APP1, a name property of a first file stored in DS1 and a name property of second file stored in DS2. However, in connection with the criteria of FIG. 6B, the displayed query results includes only a single entry indicating that "NAME1" matches the name property of a single shared folder including files for MED_APP1.

Figure 6C:
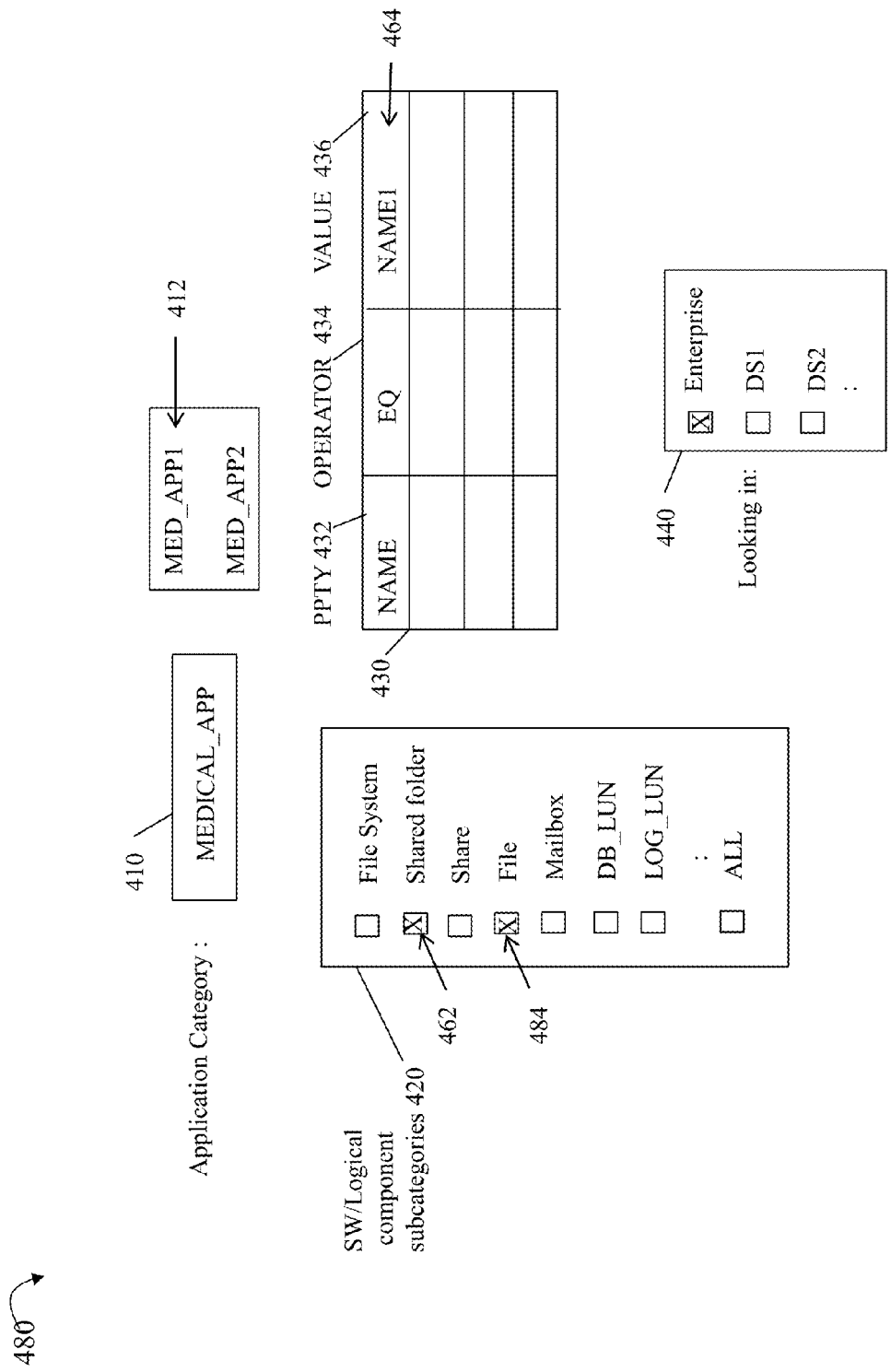

As a further example, reference is made to FIG. 6C where the search criteria is the same is in FIG. 6B with the difference that both shared folder 462 and files 484 are selected as SW component subcategories in 420. The search criteria of FIG. 6C specifies to search for the NAME property="NAME1" only in all shared folders and all files used by MED_APP1.

Figure 6D:
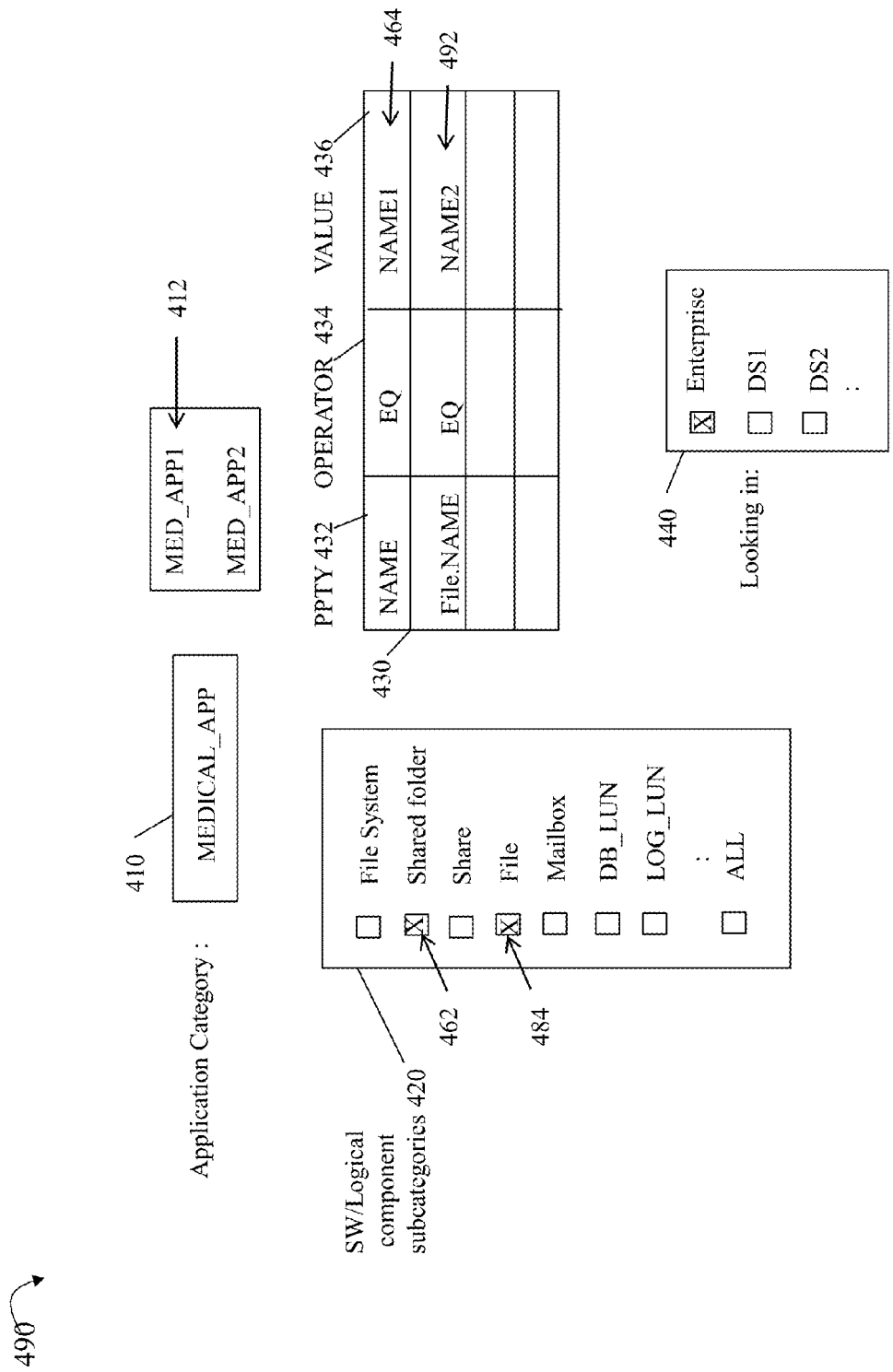

As yet another example, reference is made to FIG. 6D where the search criteria is the same is in FIG. 6C with the difference that table 430 specifies to search for objects where the name property is "NAME1" OR where the name property of a file (file.name) is "NAME2". The search criteria of FIG. 6D specifies to search for the NAME property="NAME1" in all shared folders and all files used by MED_APP1 and also searches for files having the NAME property="NAME2"

(e.g., search criteria is to display results for any shared folder or file object for MED_APP1 which has the name property="NAME1" OR any file object having the name property="NAME2".

Figure 7:
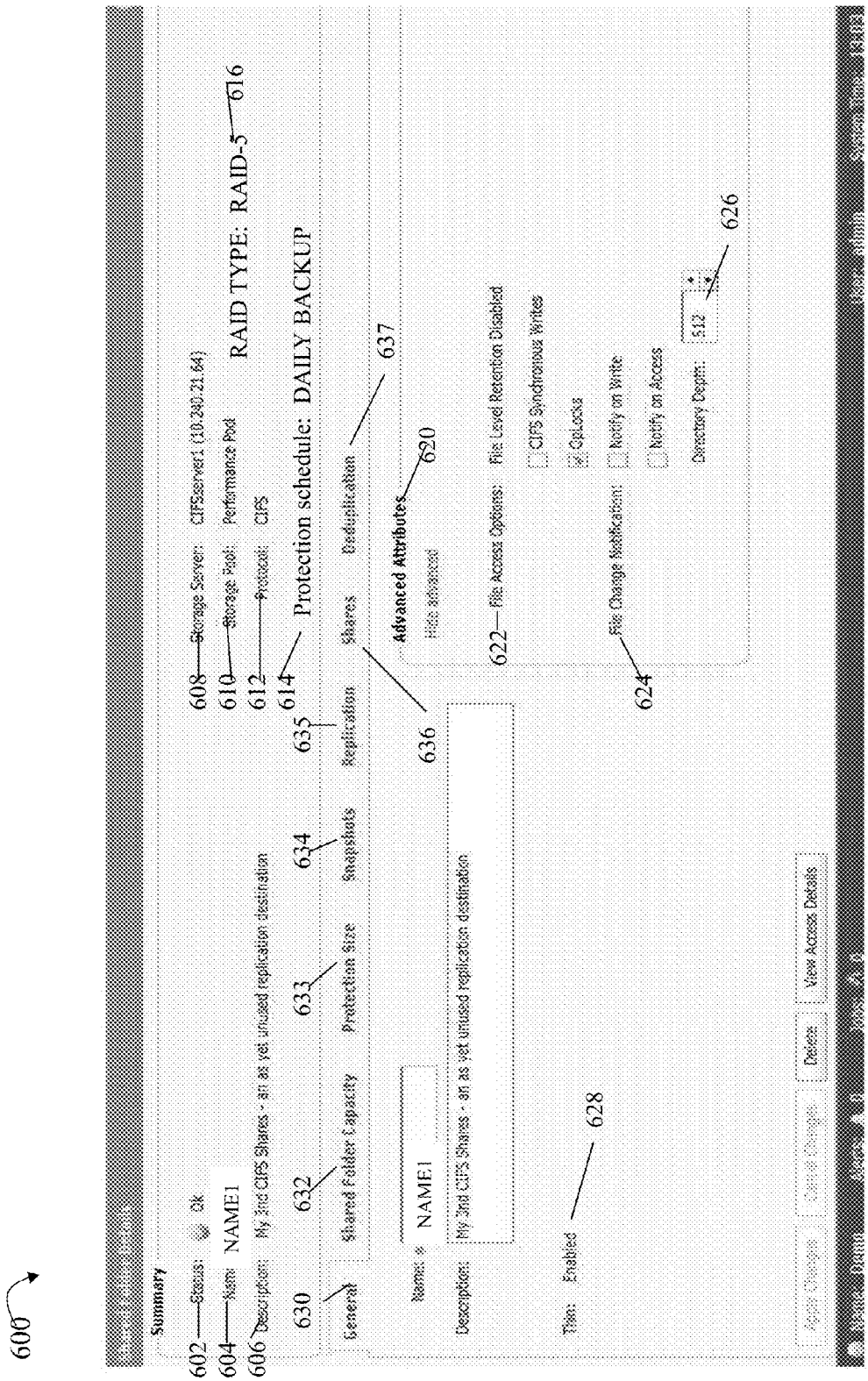
FIG. 7 is an example of information that may be displayed regarding a shared folder in an embodiment in accordance with techniques herein.

For purposes of illustration, assume that either the query results in a single shared folder. Referring now to FIG. 7, shown is an example of detailed information that may be presented for the shared folder of the query results. The example 600 includes various information about the shared folder object and also related or associated objects. For example, elements 602, 604, 606 and 612 may represent properties of the shared folder object where element 602 is the status property, element 604 is the name property, element 606 is a description property and element 612 is the protocol property. Element 608 may represent the name and IP address of the storage server configured for the shared folder. Note that a storage server object is not included in FIG. 6 but may be included in the configuration data and may be associated with the shared folder (e.g., such as using a property of the shared folder object whereby the property identifies an object including information of 608). Element 610 may represent the name property of the storage pool object associated with the shared folder. Element 616 may represent the RAID-type of RAID-5 including the property RAID TYPE from the pool object. Element 614 may include information identifying the protection schedule for files in the shared folder. Element 614 identifies that data of such files is backed up daily and may be property of the file system object associated with the application MED_APP1. The advanced attributes 620 may be properties, for example, of the file system regarding file access options 622, when notification is provided regarding file changes (e.g.. on writes, on access) 624 and the maximum directory depth 626. Element 628 denotes that the LUNs may also be virtually provisioned or thin LUNs as described elsewhere herein.

The foregoing may be displayed with selection of the general tab 630. Additional information regarding other aspects of the shared folder (properties of the shared folder and/or related objects) may be viewed by selection of one of the other illustrated tabs 632 shared folder capacity (properties of the shared folder attribute regarding allocated, used and unused storage of the shared folder), protection size 633, snapshots 634 (e.g., related snapshot objects including files of the shared folder), replication 635, shares 636 (e.g., related share objects for the shared folder), and deduplication 637 (e.g., details regarding whether and what data deduplication is performed for files in the shared folder. Deduplication may be an attribute of the file system object containing the shared folder with files used by MED_APP1).

Figure 8:
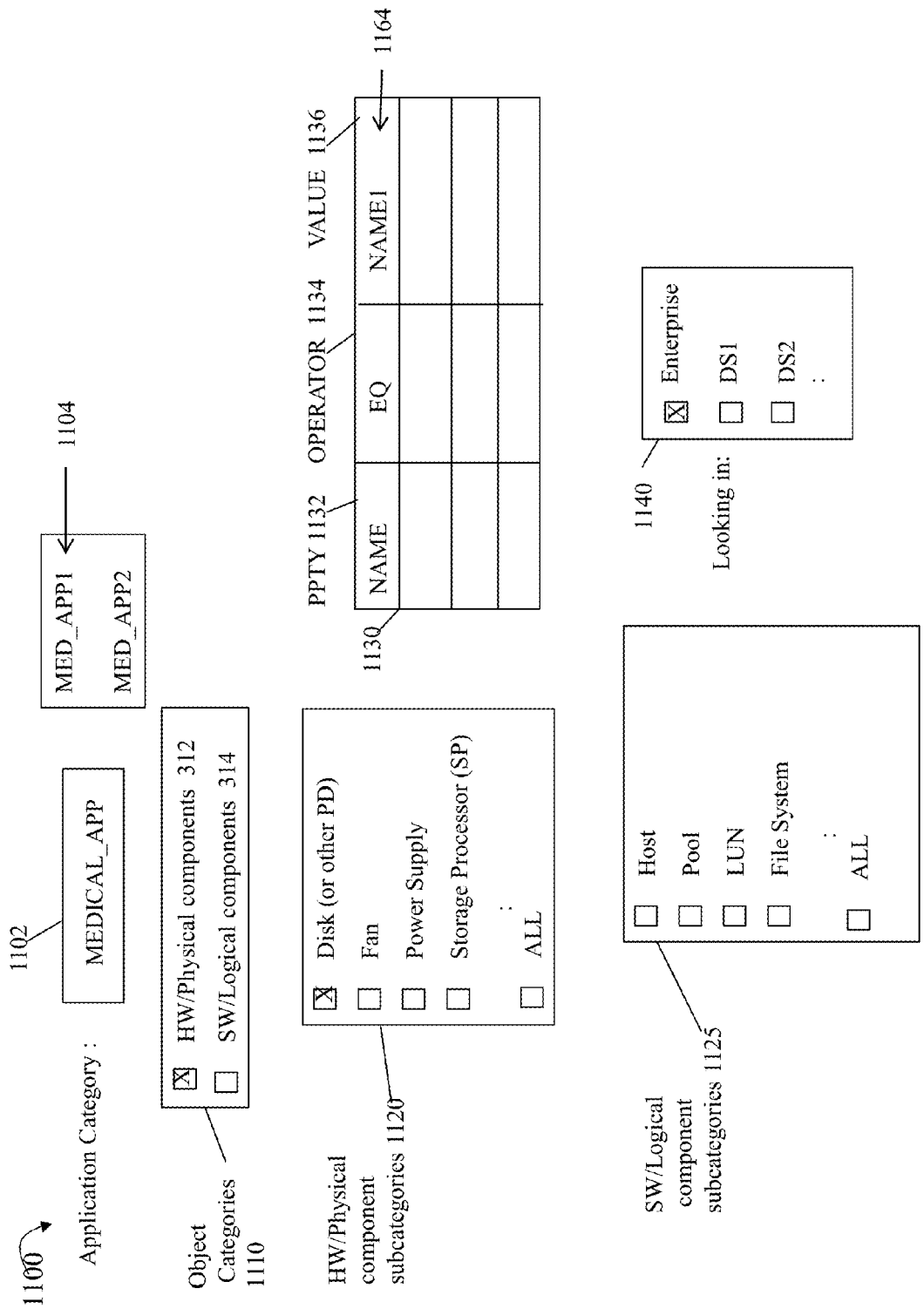

With reference to FIGS. 6A and 6B, it should be noted that an embodiment may also include an option to specify search criteria regarding related HW and SW components regarding storage provisioned for an application. For example, referring to FIG. 8, shown is an example 1100 including a GUI with search criteria that may be used in connection with techniques herein. The example 1100 includes UI elements similar to those described elsewhere in connection with other figures. Elements 1102 and 1104 respectively indicate that the selected application category is MEDICAL_APP and the application instance MED_APP1 for which searching is performed with respect to provisioned storage. Elements 1100, 1120 and 1130 indicate to search for disks in the federation having a property name of "NAME1" upon which storage is provisioned for MED_APP1. With reference back to FIG. 6, assume that PDs 524a-c represent disks (or more generally storage devices) providing the backing physical storage provisioned for use by MED_APP1. In this case, the name property of objects representing PDs 524a-c are searched to determine if any include a match for the string "NAME1".

Figure 8A:
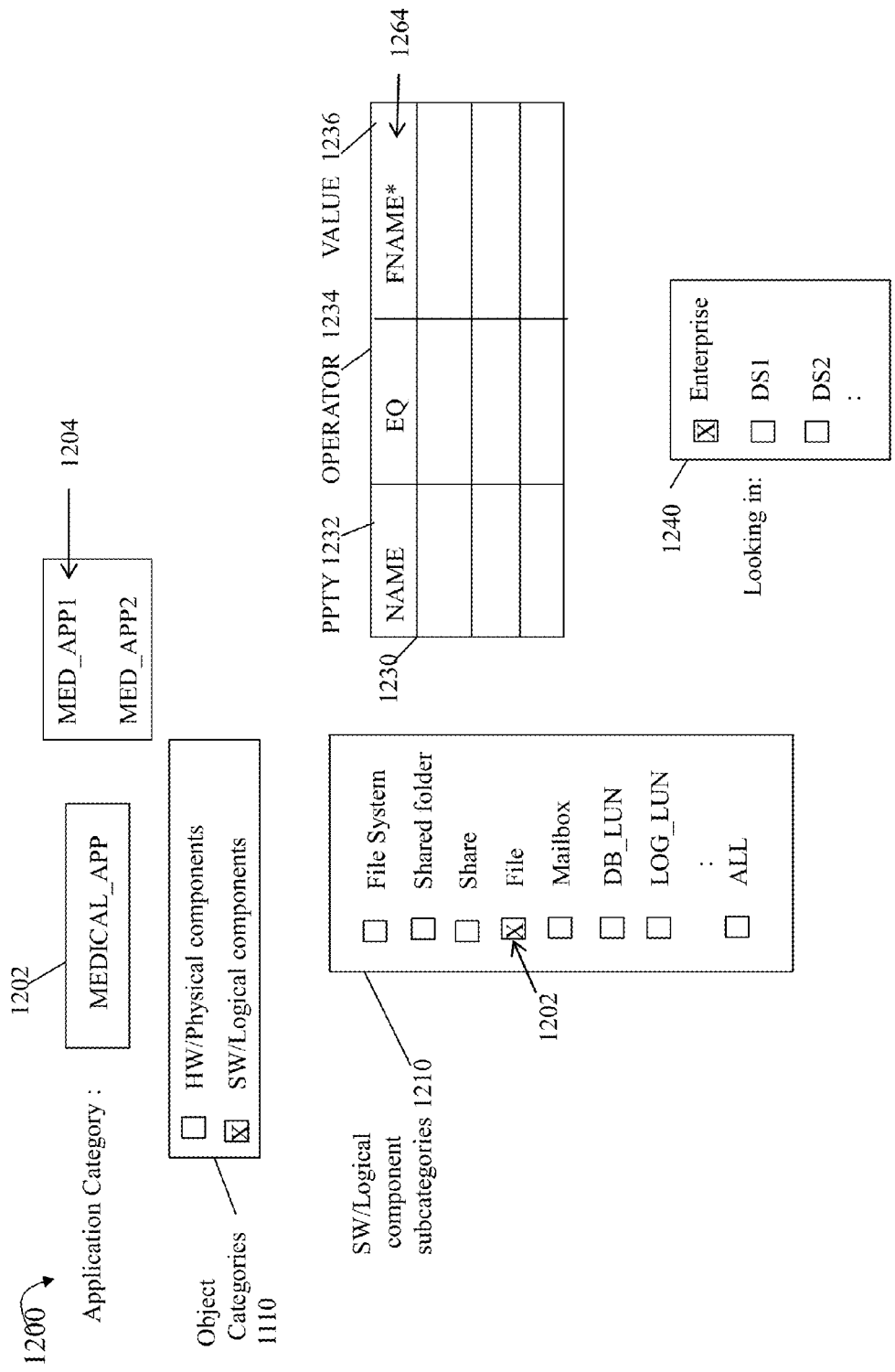

Referring to FIG. 8A, shown is an example of other search criteria that may be specified in connection with MED_APP1. The example 1200 includes UI elements similar to those described elsewhere in connection with other figures. Elements 1202 and 1204 respectively indicate that the selected application category is MEDICAL_APP and the application instance MED_APP1 for which searching is performed with respect to provisioned storage. Elements 1208, 1210 and 1230 indicate to search for files having a property name of FNAME* upon which storage is provisioned for MED_APP1. FNAME* may represent a pattern whereby the "*" denotes a wildcard pattern such as in a regular expression where a matching string includes "FNAME" optionally followed by one or more other characters (e.g. matching strings include "FNAME", "FNAME1", "FNAME V3").

Figure 8B:
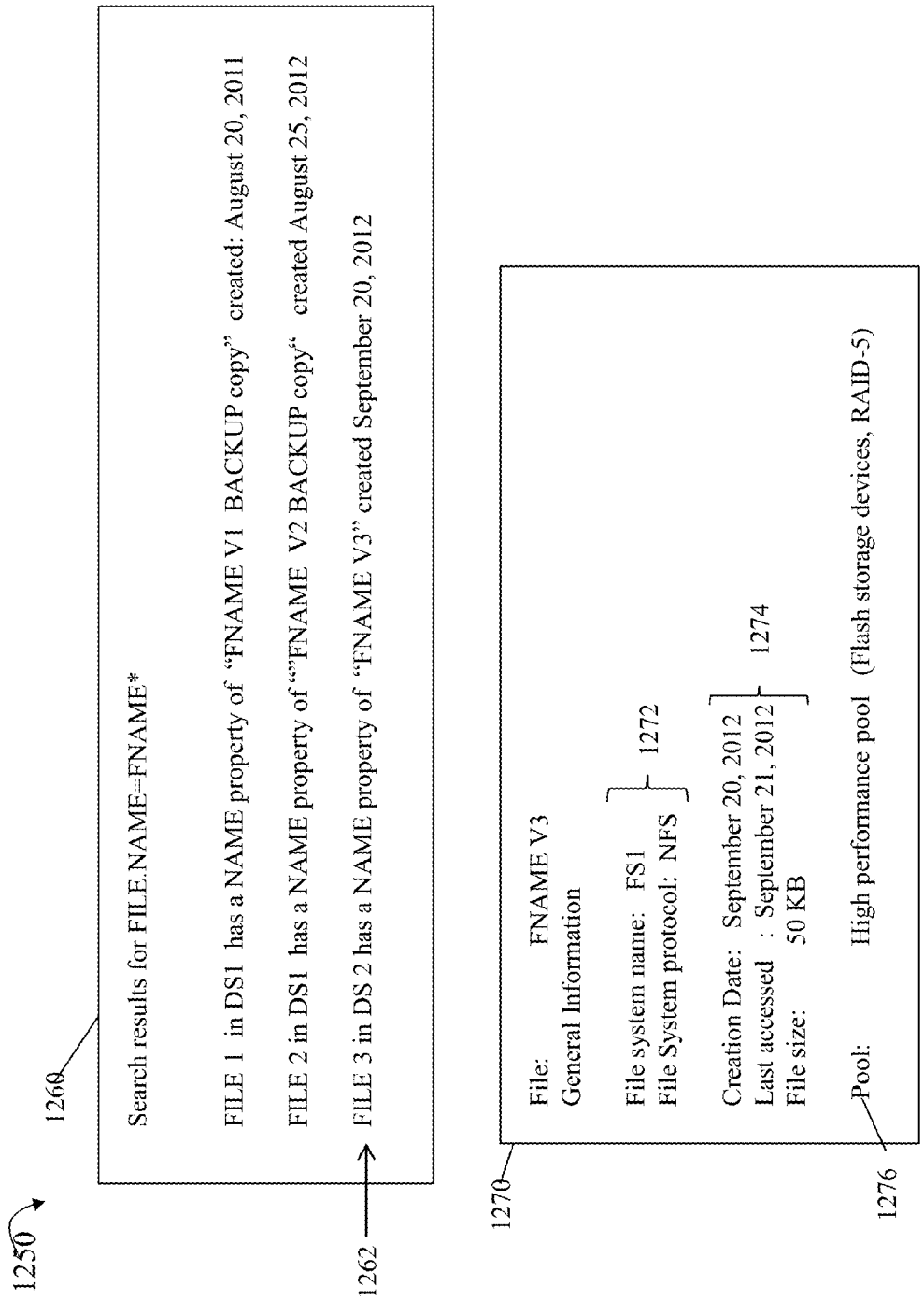

In response to the search criteria of 1200, search results of 1260 of FIG. 8B may be displayed. The results 1260 includes information for three files having storage provisioned for use by MED_APP 1. From the list displayed, selection of the third item 1262 is made resulting in display of more detailed information 1270 for the file having the NAME property of "FNAME V3". The information of 1270 includes properties of the file 1274, properties of the related file system 1272 including the file, and properties of the storage pool 1276 from which physical storage is allocated for the file "FNAME V3". In this manner, a user may use search criteria to perform a search with respect to storage provisioned for the application and drill down for more detailed desired information.

It should be noted that although only a single application is described as selected in connection with the foregoing examples, an embodiment may similarly provide an option in the UI for selection of multiple applications (e.g., two or more generally). For example, an embodiment may provide for selection of two applications such as MED_APP1 and MED_APP2, and specify search criteria which applies to storage provisioned for either application (logically ORd) as well as both applications (logically ANDed). For example, an embodiment may provide functionally for searching for the string NAME1 within any property of all files having storage provisioned for MED_APP1 OR when the string NAME1 appears within any property of all files having storage provisioned for MED_APP2. Furthermore, the multiple applications may include application instance of different application categories (e.g., such as MED_APP1 and an instance of a Microsoft Exchange server or VMWARE as described elsewhere herein).

Figure 9:
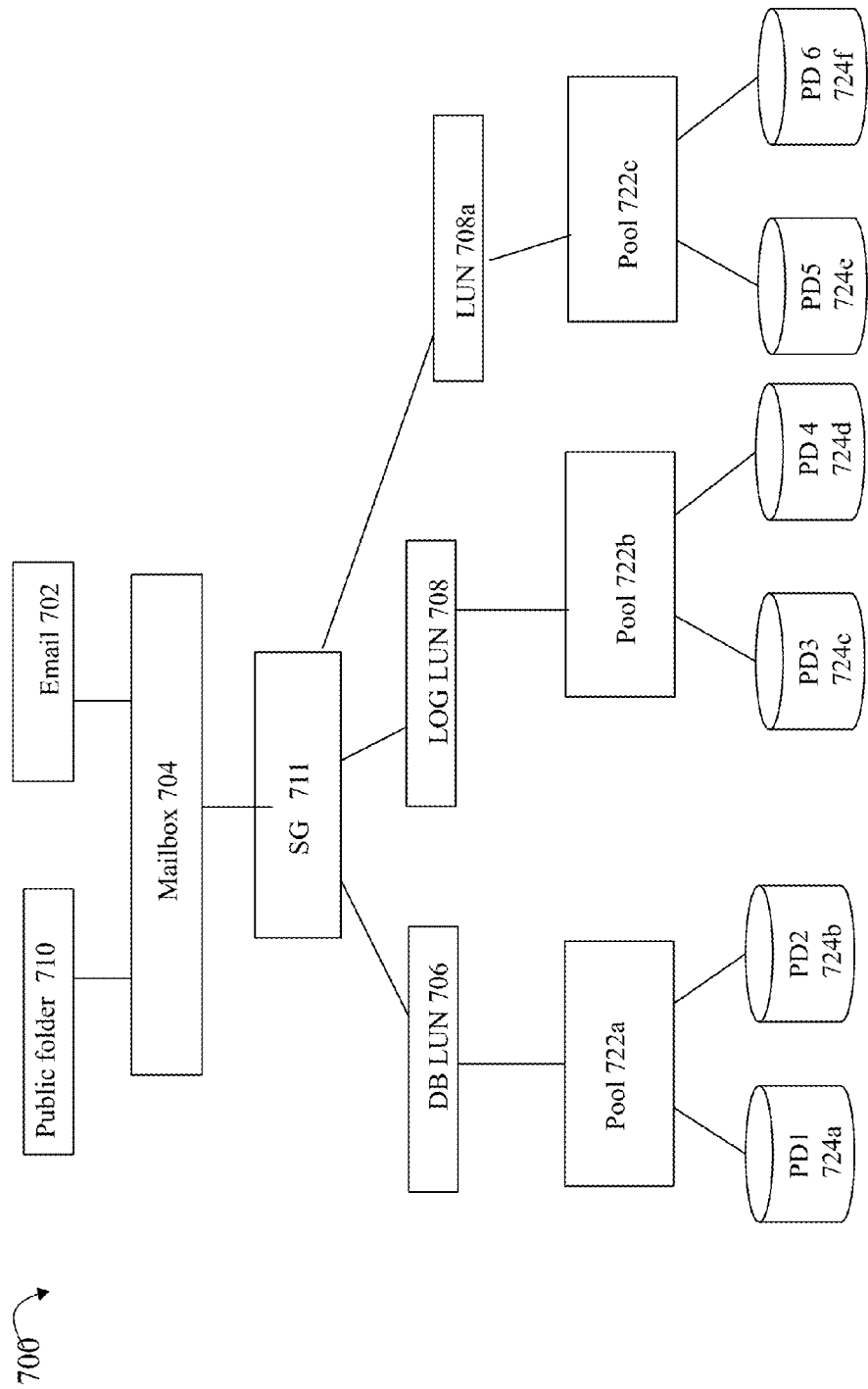
Figure 10:
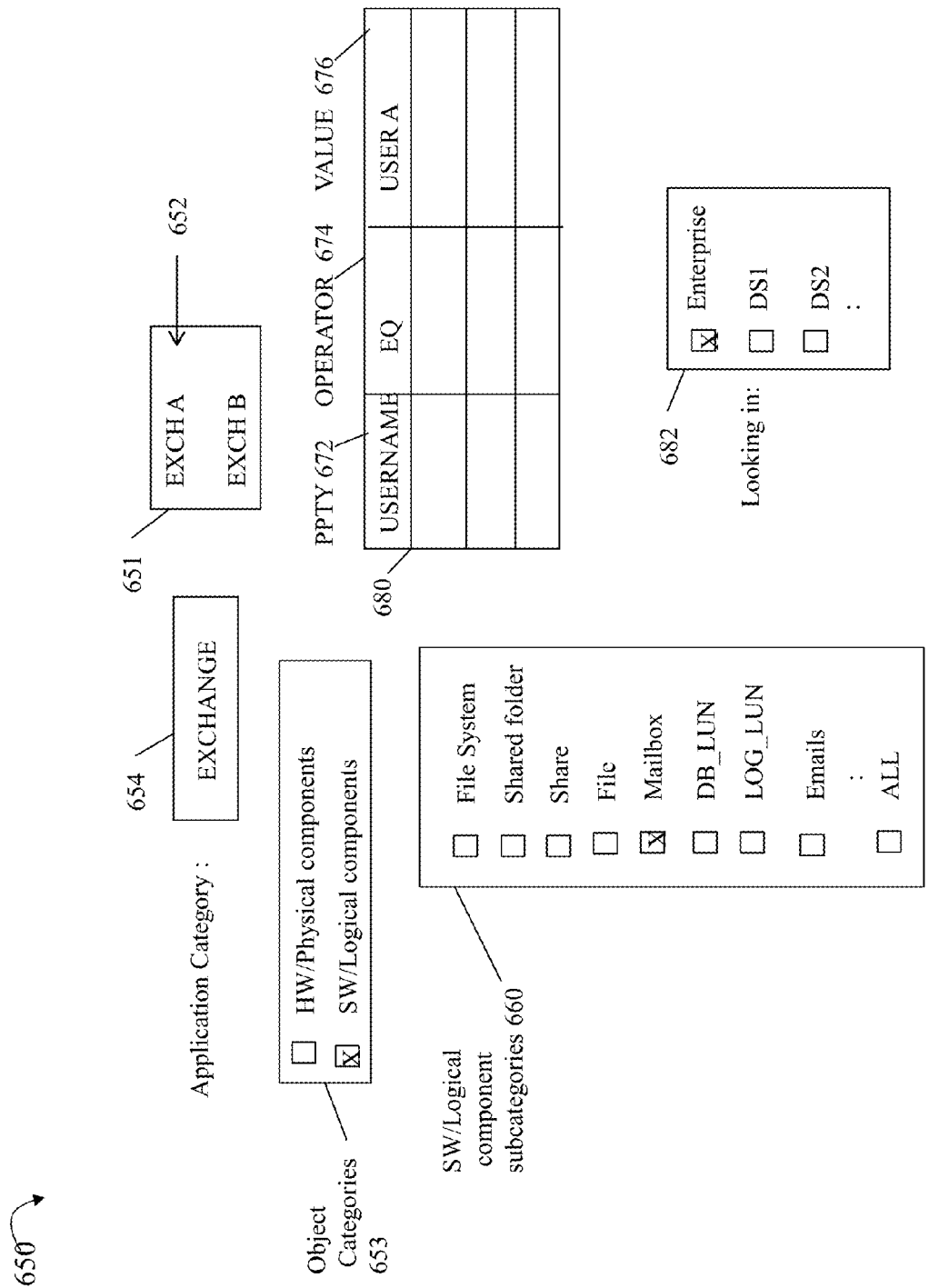
Figure 11:
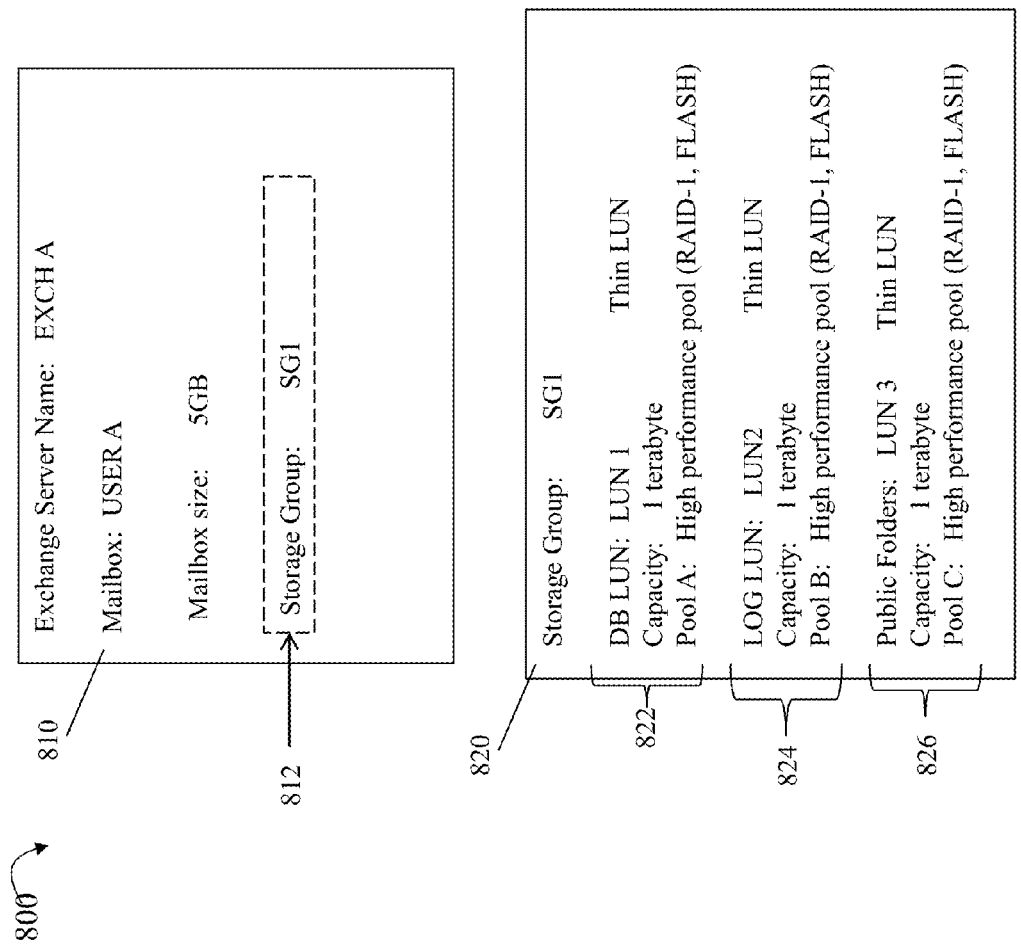

Referring now to FIGS. 9-11, another example will be described in which the selected application category is EXCHANGE denoting the Microsoft Exchange email application having storage provisioned on a data storage system such as of a federation. An instance of the Microsoft Exchange email server may store data for various mailboxes including emails as well as public folders. As known in the art, data used by Microsoft Exchange may store email data using a database. Thus, data used by Exchange may include user data and also log files used for logging database transactions. An embodiment may store the user data in one type of LUN, referred to as the DB LUN, and the log files in a different type of LUN, the LOG LUN. Public folders may be stored in a generic LUN. An SG may be a storage resource including a set of logical devices (e.g., LOG LUN, DB LUN, LUN) used for a particular instance of the Exchange Server whereby such logical devices may be used to store user data, log files and/or any public folders.

Referring to FIG. 9, shown is an example 700 of objects that may be created in the data storage system for use with an instance of Microsoft Exchange. The lines connecting the objects may represent associations or connections between related objects. PDs 724a-c may be disks (or more generally storage devices) such as SSDs. PDs 724a-b, 724c-d and 724e-f may be configured, respectively, into 3 pools 722a-c. DB LUN 706 (storing user data) may be configured from pool 722a. LOG LUN 708 (storing the DB log files) may be configured from pool 722b. LUN 708a (providing data for public folders) may be configured from pool 722c File system 510 may be configured using LUNs 512a-c. The LUNs 706, 708 and 708a may be included in SG 711. An Exchange user's email box (mailbox) 704 may use resources associated with SG 711. The mailbox may include a public folder 710 and email 702. In this representation, an object may exist for each public folder, mailbox, email, and the like, although only a single instance of each type of object is illustrated in FIG. 9 for simplicity.

Referring to FIG. 10, shown is an example of search criteria that may be specified for application content-based searching for Exchange. The example 650 includes an application category 654 identifying selection of an application category EXCHANGE. In response, a list 651 of one or more Exchange instances for which storage is allocated in the storage federation may be displayed. Selection may be made 652 of one instance of Exchange, EXCH A. Consistent with other examples provided herein, elements 653, 660, 680 and 682 specify search criteria to search in the storage federation for only mailboxes for application EXCH A having a USER-NAME property="USER A".

Referring to FIG. 11, element 810 may represent the search results displayed in accordance with the criteria of FIG. 10. Element 810 provides some information for the mailbox with the username property="USER A". Element 810 may include the size of the mailbox (5 GB, may be a property of the mailbox object) and the storage group (property name=SG1 where this is a property of the SG object) from which storage is provisioned for the mailbox. A selection 812 may be made from the displayed information 810 to provide additional detail about the storage group SG1 providing the mailbox storage. In response to selecting 812, the information 820 may be displayed providing the additional detail. Element 820 includes information 822 regarding the DB LUN (name LUN1) storing the mailbox user data, information 824 regarding the LOG LUN (name LUN2) storing the log files for the mailbox USER A, and information 826 regarding the LUN (name LUN 3) storing public folders for the mailbox USER A. Element 822 indicates that the DB LUN has virtual provisioning enabled, a capacity of 1 TB, and is allocated from POOL A which is a high performance pool of flash devices in a RAID-1 configuration. Element 824 indicates that the LOG LUN has virtual provisioning enabled, a capacity of 1 TB, and is allocated from POOL B which is a high performance pool of flash devices in a RAID-1 configuration. Element 826 indicates that the public folder are located on a LUN that has virtual provisioning enabled, a capacity of 1 TB, and is allocated from POOL C which is a high performance pool of flash devices in a RAID-1 configuration. As described above, information displayed in 822, 824 and 826 may include LUN properties (e.g., LUN name, capacity and indication of virtual provisioned LUN may be properties of the LUN object), one or more associated pool properties (e.g., pool properties indicating the RAID type=RAID-1) and one or more associated disk properties (e.g., disk or PD property indicating the type of physical devices as flash-based or SSD storage).

Described above are techniques that may be used to perform searching in a data storage environment using a set of aggregated storage configuration data for one or more data storage systems such as may be included in a federation. Searching may be performed by matching properties of objects across multiple types of objects, multiple properties and/or multiple data storage systems. Searches may be performed for specific categories of objects, such as across all HW/physical components and/or SW/logical components. The logical entities may include file-based entities as well as other entities associated with particular applications. For example, the SW entities (object types for logical entities) may include file, file system, shared folder, and share as well as DB LUN, LOG LUN, mailbox, email, and public folder. Additionally, searching may be performed with respect to storage provisioned for a selected application. For example, search criteria may be specified to list all PDs and/or other entities meeting the search criteria for the particular application where searching is performed with respect to objects representing aspects related to the application's provisioned storage.

Figure 12:
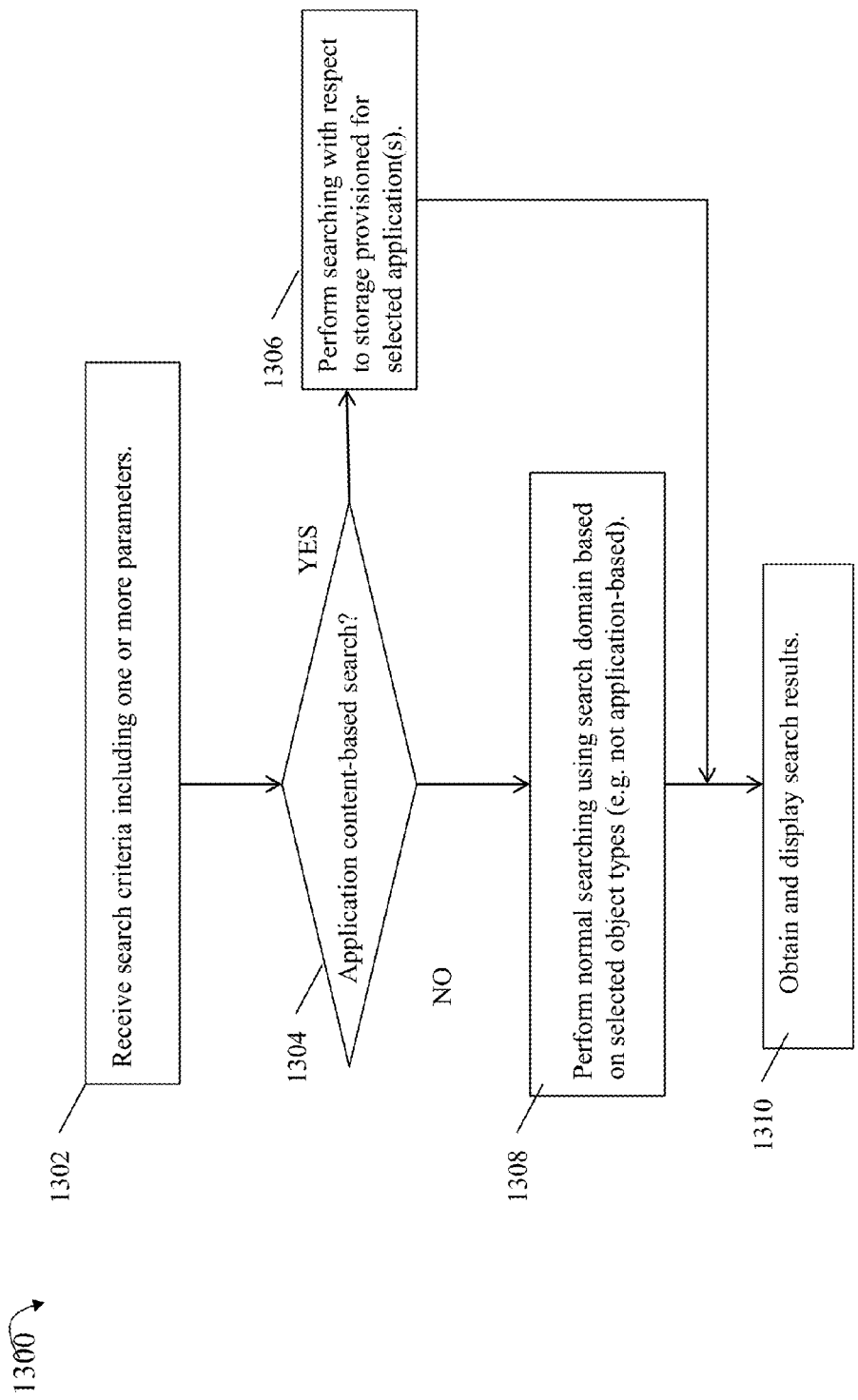
FIG. 12 is a flowchart of processing steps that may be performed in an embodiment in accordance with techniques herein.

Referring to FIG. 12, shown is a flowchart summarizing processing steps that may be performed in an embodiment in accordance with techniques herein. In step 1302, search criteria including one or more parameters may be received. In step 1304, a determination is made as to whether the search is application-based (or application content-based) whereby searching is performed with respect to objects related to storage provisioned for the selected application. If step 1304 evaluates to yes, control proceeds to step 1306 to perform searching with respect to storage provisioned for the selected application(s). Control then proceeds to step 1310 to obtain and display the search results. If step 1304 evaluates to no, control proceeds to step 1308 to perform normal mode searching using a search domain based on object types that is not based on storage provisioned for any particular application. Control then proceeds to step 1310.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method of searching comprising;
  selecting an application category from a plurality of application categories, said plurality of application categories identifying different classes of applications for which storage provisioning is supported in a data storage envi- ronment comprising one or more data storage systems, said plurality of application categories including a database application, an electronic mail application, and a virtualized environment whereby applications executing in the virtualized environment have storage provisioned in the data storage environment;

responsive to selecting the application category, selecting one or more application instances of the selected application category;

receiving search criteria including the one or more selected application instances and one or more parameters;

determining, in accordance with said search criteria whether to perform application-based searching or non-application-based searching;

responsive to determining to perform application-based searching based on storage provisioned for the one or more selected applications identified in said search criteria rather than non-application-based searching, performing first processing in accordance with said search criteria, and otherwise performing second processing in accordance with said search criteria; and receiving search results produced as a result of one of said first processing and said second processing.

2. The method of claim 1, wherein said first processing and said second processing include searching, in accordance with said search criteria, data storage configuration data for the one or more data storage systems.

3. The method of claim 1, wherein said search criteria identifies a first application having storage provisioned on at least one of the data storage systems and said determining determines that searching is performed based on storage provisioned for the first application, and wherein said first processing includes determining a set of one or more objects in the data storage configuration data associated with storage provisioned for said first application.

4. The method of claim 3, wherein said first processing includes searching the set of one or more objects in accordance with said search criteria.

5. The method of claim 2, wherein said search criteria identifies any of a physical entity in a first of the one or more data storage systems and a logical entity in any of the one or more data storage systems.

6. The method of claim 5, wherein the search criteria identifies a physical entity that is any of a disk, a physical storage device, a hardware module, a power supply, a link control card, a standby or secondary power supply, a storage processor.

7. The method of claim 5, wherein the search criteria identifies a logical entity that is any of a host, a pool, a logical storage device, a file system, a shared folder, a share, file, an application, a mailbox, an email, a mail folder, a clone, a mirror, a pool, a named RAID group, a storage group, a virtually provisioned device, an email application, a medical application, a database application, and a data store associated with storage used by applications executing in a virtualized environment on a host.

8. The method of claim 2, wherein said search criteria indicates to perform a search with respect to one or more properties of multiple types of objects.

9. The method of claim 8, wherein said search criteria indicates to search one or more properties of multiple types of objects to determine if any of said one or more properties of any of said multiple types of objects include a specified value.

10. The method of claim 2, wherein said data storage configuration data includes objects of a first category and a second category, said first category including multiple types of objects associated with physical entities on the one or more data storage systems and said second category including multiple types of objects associated with logical entities of the one or more data storage systems, and wherein search criteria identifies to search all object types included in one of said first category and said second category.

11. The method of claim 2, wherein said data storage configuration data includes objects representing physical and logical entities in the one or more data storage systems and said second processing includes determining whether values for one or more properties of at least some of the objects match said search criteria.

12. The method, of claim 11, wherein said search criteria identifies a category of object types denoting multiple types of objects and said second processing includes searching said multiple types of objects.

13. The method of claim 2, wherein the data storage configuration information represents a data storage configuration for a federation including a plurality of data storage systems.

14. An apparatus comprising:
a plurality of data storage systems configured as a data storage federation;
data storage configuration data stored in a memory;
a management system comprising a non-transitory computer readable medium with code stored thereon for performing processing including:
selecting an application category from a plurality of application categories, said plurality of application categories identifying different classes of applications for which storage provisioning is supported in the data storage federation, said plurality of application categories including a database application, an electronic mail application, and a virtualized environment whereby applications executing in the virtualized environment have storage provisioned in the data storage federation;
responsive to selecting the application category, selecting one or more application instances of the selected application category;
receiving search criteria including the one or more selected application instances and one or more parameters;
determining, in accordance with the search criteria, whether to perform application-based searching or non-application based searching;
responsive to determining to perform application-based searching based on storage provisioned for the one or more selected applications identified in said search criteria rather than non-application-based searching, performing first processing in accordance with said search criteria, and otherwise performing second processing in accordance with said search criteria; and
receiving search results produced as a result of one of said first processing and said second processing.

15. A non-transitory computer readable medium comprising code stored thereon for searching, the non-transitory computer readable medium comprising code that, when executed, performs a method comprising:
selecting an application category from a plurality of application categories, said plurality of application categories identifying different classes of applications for which storage provisioning is supported in a data storage environment comprising one or more data storage systems, said plurality of application categories including a database application are electronic mail a application, and virtualized environment whereby applications executing in the virtualized environment have storage provisioned in the data storage environment;

responsive to selecting the application category, selecting one or more application instances of the selected application category;

receiving search criteria including the one or more selected application instances and one or more parameters;

determining, in accordance with said search criteria, whether to perform application-based searching or non-application-based searching, responsive to determining to perform application-based searching based on storage provisioned for the one or more selected applications identified in said search criteria rather than non-application-based searching, performing first processing in accordance with said search criteria, and otherwise performing second processing in accordance with said search criteria; and receiving search results produced as a result of one of said first processing and said second processing.

16. The non-transitory computer readable medium of claim 15, wherein said first processing and said second processing include searching, in accordance with said search criteria, data storage configuration data for the one or more data storage systems.

17. The non-transitory computer readable medium of claim 15, wherein said search criteria identifies a first application having storage provisioned on at least one of the data storage systems and said determining determines that searching is performed based on storage provisioned for the first application, and wherein said first processing includes determining a set of one or more objects in the data storage configuration data associated with storage provisioned for said first application.

18. The non-transitory computer readable medium of claim 17, wherein said first processing includes searching the set of one or more objects in accordance with said search criteria.

19. The non-transitory computer readable medium of claim 16, wherein said search criteria identifies any of a physical entity in a first of the one or more data storage systems and a logical entity in any of the one or more data storage systems.

20. The non-transitory computer readable medium of claim 19, wherein the search criteria identifies a physical entity that is any of a disk, a physical storage device, a hardware module, a power supply, a link control card, a standby or secondary power supply, a storage processor and wherein the search criteria identifies a logical entity that is any of a host, a pool, a logical storage device, a file system, a shared folder, a share, file, an application, a mailbox, an email, a mail folder, a clone, a mirror, a pool, a named RAID group, a storage group, a virtually provisioned device, an email application, a medical application, a database application, and a data store associated with storage used by applications executing in a virtualized environment on a host.

* * * * *